US012727043B2

(12) United States Patent
Chen et al.

(10) Patent No.: US 12,727,043 B2
(45) Date of Patent: Sep. 1, 2026

(54) MOBILE CALL METHOD AND ELECTRONIC DEVICE

(71) Applicant: Honor Device Co., Ltd., Shenzhen (CN)

(72) Inventors: Jiazi Chen, Shenzhen (CN); Feng Ge, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 54 days.

(21) Appl. No.: 18/707,774

(22) PCT Filed: Dec. 12, 2022

(86) PCT No.: PCT/CN2022/138486
§ 371 (c)(1),
(2) Date: May 6, 2024

(87) PCT Pub. No.: WO2023/207130
PCT Pub. Date: Nov. 2, 2023

(65) Prior Publication Data

US 2025/0008585 A1 Jan. 2, 2025

(30) Foreign Application Priority Data

Apr. 28, 2022 (CN) ........................ 202210471472.X

(51) Int. Cl.
*H04W 76/15* (2018.01)
*H04L 65/1089* (2022.01)
(Continued)

(52) U.S. Cl.
CPC ......... *H04W 76/15* (2018.02); *H04L 65/1089* (2013.01); *H04L 65/4015* (2013.01); *H04L 65/403* (2013.01); *H04M 1/72412* (2021.01)

(58) Field of Classification Search
CPC .. H04W 76/15; H04M 1/72412; H04L 65/403
See application file for complete search history.

(56) References Cited

U.S. PATENT DOCUMENTS

| | | | |
|---|---|---|---|
| 10,038,790 | B2 | 7/2018 | Baek |
| 10,187,870 | B1 | 1/2019 | Achamola et al. |

(Continued)

FOREIGN PATENT DOCUMENTS

| | | | |
|---|---|---|---|
| CN | 104270827 | A | 1/2015 |
| CN | 105577959 | A | 5/2016 |

(Continued)

*Primary Examiner* — Amal S Zenati
(74) *Attorney, Agent, or Firm* — Slater Matsil, LLP

(57) ABSTRACT

This application provides a mobile call method and an electronic device, which relate to the field of communication technologies. The method includes: establishing, by the first electronic device, a mobile call connection with a third electronic device and performing a first mobile call with the third electronic device by using the mobile call connection; when a preset call function is enabled, supporting, by the first electronic device by using the mobile call connection and the first wireless communication connection, the second electronic device to perform a second mobile call with the third electronic device; and in response to a first event, stopping supporting, by the first electronic device, the second electronic device to perform the second mobile call with the third electronic device, and performing a third mobile call with the third electronic device by using the mobile call connection.

20 Claims, 18 Drawing Sheets

(51) Int. Cl.
*H04L 65/401* (2022.01)
*H04L 65/403* (2022.01)
*H04M 1/72412* (2021.01)

(56) References Cited

U.S. PATENT DOCUMENTS

| | | | | |
|---|---|---|---|---|
| 2016/0127559 | A1 | 5/2016 | Baek | |
| 2018/0376238 | A1* | 12/2018 | Schobel | H04W 76/10 |
| 2021/0400091 | A1 | 12/2021 | Deng et al. | |
| 2022/0400305 | A1 | 12/2022 | Huang et al. | |

FOREIGN PATENT DOCUMENTS

| | | | | |
|---|---|---|---|---|
| CN | 106255075 | A | 12/2016 | |
| CN | 110138937 | A | 8/2019 | |
| CN | 112714214 | A | 4/2021 | |
| CN | 110138937 | B * | 6/2021 | H04W 4/16 |
| CN | 113099026 | A | 7/2021 | |
| CN | 113727289 | A | 11/2021 | |
| EP | 3846402 | A1 | 7/2021 | |

* cited by examiner

MOBILE CALL METHOD AND ELECTRONIC DEVICE

CROSS-REFERENCE TO RELATED APPLICATIONS

This application is a national stage of International Application No. PCT/CN2022/138486, filed on Dec. 12, 2022, which claims priority to Chinese Patent Application No. 202210471472.X, filed on Apr. 28, 2022. The disclosures of both of the aforementioned applications are hereby incorporated by reference in their entireties.

TECHNICAL FIELD

This application relates to the field of communication technologies, and in particular, to a mobile call method and an electronic device.

BACKGROUND

With development of technologies, there are increasing types of electronic devices, and the number of users owning a plurality of electronic devices increases accordingly. Different electronic devices have different main functions. For example, one of main functions of a mobile phone is to provide a user with a mobile call service (including voice and video call services) by using a mobile communications network; while one of main functions of a tablet computer is to provide a user with voice or video communication by using an instant messaging application (for example, WeChat) over a wireless local area network. In some scenarios, a user may wish to implement a mobile call by using another electronic device (such as a tablet computer or a smart watch) that does not have the foregoing function of "performing a mobile call over a mobile communications network".

A synchronous call function is proposed in a related technology. By using the synchronous call function, a mobile phone may transfer a mobile call of the mobile phone to another electronic device that has a connection (such as a Wi-Fi connection or a Bluetooth connection) with the mobile phone. In this way, a user can not only answer or make a call by using the mobile phone, but also answer a call from the mobile phone by using another electronic device or control the mobile phone to make a call. However, in a process of implementing the foregoing synchronous call function, a mobile call ends if the connection between the mobile phone and the another electronic device is unstable, or the user disables the synchronous call function by mistake. That is, by using the foregoing related technology, a mobile call is easily disconnected by mistake, which affects call experience of the user.

SUMMARY

Embodiments of this application provide a mobile call method and an electronic device, which can reduce a possibility that a mobile call is disconnected by mistake and improve call experience of a user in a process in which two electronic devices perform the mobile call by using a synchronous call function.

To achieve the foregoing objective, the following technical solutions are used in the embodiments of this application:

According to a first aspect, a mobile call method is provided and is applied to a first electronic device. A first wireless communication connection is established between the first electronic device and a second electronic device, and the first wireless communication connection is a short-range wireless communication technology connection. The method includes:

The first electronic device establishes a mobile call connection with a third electronic device by using a mobile communications network, and a first mobile call is performed between the first electronic device and the third electronic device by using the mobile call connection. When a preset call function is enabled for both the first electronic device and the second electronic device, the first electronic device may transfer the first mobile call to the second electronic device by using the first wireless communication connection, so as to support, by using the mobile call connection and the first wireless communication connection, the second electronic device to perform a second mobile call with the third electronic device. In response to a first event, the first electronic device stops supporting, by using the mobile call connection and the first wireless communication connection, the second electronic device to perform the second mobile call with the third electronic device. In addition, the first electronic device transfers the mobile call back to the first electronic device. That is, the first electronic device performs a third mobile call with the third electronic device by using the mobile call connection.

By using the technical solution, the first wireless communication connection is established between the first electronic device and the second electronic device. The first electronic device establishes the mobile call connection with the third electronic device, and performs the first mobile call with the third electronic device by using the mobile call connection. If the preset call function is enabled for both the first electronic device and the second electronic device, the first electronic device may transfer the first mobile call to the second electronic device by using the mobile call connection and the first wireless communication connection. That is, the first electronic device supports, by using the first wireless connection and the mobile call connection, the second electronic device to perform the second mobile call with the third electronic device. In a process of performing the foregoing second mobile call, if the first electronic device detects the first event, the first electronic device may transfer the mobile call from the second electronic device back to the first electronic device instead of directly disconnecting the mobile call between the first electronic device and the third electronic device. In this way, a possibility that the mobile call between the first electronic device and the third electronic device is disconnected by mistake can be reduced, and call experience of a user can be improved.

In a possible implementation, that the first electronic device supports, by using the mobile call connection and the first wireless communication connection, the second electronic device to perform a second mobile call with the third electronic device specifically includes that: The first electronic device receives, by using the first wireless communication connection, first audio data that is from the second electronic device and collected by the second electronic device, and sends the first audio data to the third electronic device by using the mobile call connection. The first electronic device further receives second audio data from the third electronic device by using the mobile call connection, and sends the second audio data to the second electronic device by using the first wireless communication connection. By using the technical solution, the second electronic device can perform a mobile call with the third electronic device by using a mobile call service of the first electronic device.

In a possible implementation, the foregoing first event is that the preset call function in the first electronic device or the second electronic device is disabled. If the preset call function in the first electronic device or the second electronic device is disabled, it indicates that the first electronic device cannot implement a mobile call function of the first electronic device on the second electronic device. In this case, the first electronic device transfers the mobile call back to the first electronic device instead of directly disconnecting the mobile call between the first electronic device and the second mobile call. In this way, a possibility that the mobile call is disconnected by mistake can be reduced, and call experience of a user can be improved.

In a possible implementation, the foregoing first event includes at least one of the following events: a wireless communication function corresponding to the first wireless communication connection in the first electronic device or the second electronic device is disabled; signal strength of the first wireless communication connection is less than a first strength threshold. If the wireless communication function corresponding to the first wireless communication connection in the first electronic device or the second electronic device is disabled, or the signal strength of the first wireless communication connection is less than the first strength threshold, it indicates that the mobile call function of the first electronic device can be implemented on the second electronic device, but call quality of a user cannot be ensured. In this case, the first electronic device transfers the mobile call back to the first electronic device instead of directly disconnecting the mobile call between the first electronic device and the second mobile call. In this way, a possibility that the mobile call is disconnected by mistake can be reduced, and call experience of a user can be improved.

In a possible implementation, a short-range wireless communication technology connection that is different from the first wireless communication connection, for example, a second wireless communication connection, is established between the first electronic device and the second electronic device. When the first event is that the wireless communication function corresponding to the first wireless communication connection in the first electronic device or the second electronic device is disabled, or the signal strength of the first wireless communication connection is less than the first strength threshold, after that in response to a first event, the first electronic device stops supporting, by using the mobile call connection and the first wireless communication connection, the second electronic device to perform the second mobile call with the third electronic device, and before that the first electronic device performs a third mobile call with the third electronic device by using the mobile call connection, the mobile call method further includes that:

The first electronic device supports, by using the mobile call connection and the second wireless communication connection, the second electronic device to perform the second mobile call with the third electronic device. When a second event occur, in response to the second event, the first electronic device stops supporting, by using the mobile call connection and the second wireless communication connection, the second electronic device to perform the second mobile call with the third electronic device. The second event includes at least one of the following events: the preset call function in the first electronic device or the second electronic device is disabled; signal strength of the second wireless communication connection is less than a second strength threshold; a wireless communication function corresponding to the second wireless communication connection in the first electronic device or the second electronic device is disabled.

By using the technical solution, when two different types of short-range wireless communication connections are established between the first electronic device and the second electronic device, if the wireless communication function corresponding to the first wireless communication connection is disabled, or the signal strength of the first wireless communication connection is less than the first strength threshold, the first electronic device may further support, by using the second wireless communication connection, the second electronic device to perform the second mobile call with the third electronic device. Then, if the second event occurs, it indicates that the first electronic device cannot implement the mobile call function of the first electronic device on the second electronic device, or the first electronic device can implement the mobile call function of the first electronic device on the second electronic device, but call quality of a user cannot be ensured. In this case, the first electronic device transfers, in response to the second event, the mobile call back to the first electronic device, and the first electronic device performs the third mobile call with the second electronic device by using the mobile call connection. In this way, frequent transfer of the mobile call between the first electronic device and the second electronic device can be avoided, and call experience of a user can be improved.

In a possible implementation, when the first event is that the preset call function in the first electronic device or the second electronic device is disabled, or the wireless communication function corresponding to the first wireless communication connection in the first electronic device or the second electronic device is disabled, after that when a preset call function is enabled, the first electronic device supports, by using the mobile call connection and the first wireless communication connection, the second electronic device to perform a second mobile call with the third electronic device, the mobile call method further includes that: The first electronic device ends, in response to a third event, the mobile call between the first electronic device and the third electronic device. The third event includes that: signal strength of the first wireless communication connection is less than a first strength threshold.

By using the technical solution, when the first electronic device transfers the mobile call to the second electronic device by using the first wireless communication connection, if the first electronic device detects that the signal strength of the first wireless communication connection is less than the first strength threshold, it indicates that a distance between the first electronic device and the first electronic device may be relatively long. In this case, the first electronic device ends, in response to the third event, the mobile call between the first electronic device and the first electronic device. In this way, the following case can be avoided: after the mobile call is transferred from the first electronic device back to the second electronic device, a user cannot move in a timely manner near the first electronic device and use the first electronic device to continue the mobile call. Therefore, call experience of the user is improved.

In a possible implementation, the mobile call method further includes that: The electronic device sends, in response to the first event, first prompt information. The first prompt information is used to prompt a user that the mobile call between the first electronic device and the third electronic device is to be transferred from the second electronic device to the first electronic device.

In a possible implementation, the first prompt information is further used to prompt a user why the mobile call between the first electronic device and the third electronic device is transferred from the second electronic device to the first electronic device.

In a possible implementation, a call type of the first mobile call is a video call or a voice call, and a call type of the second mobile call is a voice call. A call type of the third mobile call is the same as the call type of the first mobile call, or the call type of the third mobile call is the same as the call type of the second mobile call.

In a possible implementation, when a call type of the first mobile call is a video call, and a call type of the second mobile call is a voice call, after that the first electronic device stops supporting, by using the mobile call connection and the first wireless communication connection, the second electronic device to perform the second mobile call with the third electronic device and before that the first electronic device performs a third mobile call with the third electronic device by using the mobile call connection, the mobile call method further includes that: The first electronic device sends second prompt information that is used to request the user to select a call type of the third mobile call. Then, the first electronic device determines, in response to a first selection operation performed by the user on the second prompt information, that the call type of the third mobile call is a video call; the first electronic device determines, in response to a second selection operation performed by the user on the second prompt information, that the call type of the third mobile call is a voice call. In this case, the user may select the call type of the third mobile call to meet diversified use requirements of the user.

According to a second aspect, an electronic device is further provided, and includes: one or more processors, a memory, a wireless communications module, and a mobile communications module. The memory, the wireless communications module, and the mobile communications module are coupled to the one or more processors, the memory is configured to store computer program code, the computer program code includes computer instructions, and when the one or more processors execute the computer instructions, the electronic device performs the mobile call method according to the first aspect or any one of the implementations of the first aspect.

According to a third aspect, a computer-readable storage medium is provided. The computer-readable storage medium stores instructions. The instructions, when running on a computer, cause the computer to perform the mobile call method according to the first aspect or any one of the implementations of the first aspect.

For the technical effects brought by any one of the design manners in the second aspect and the third aspect, refer to the technical effects brought by different design manners in the first aspect, and details are not described herein again.

DETAILED DESCRIPTION OF ILLUSTRATIVE EMBODIMENTS

Figure 1A:
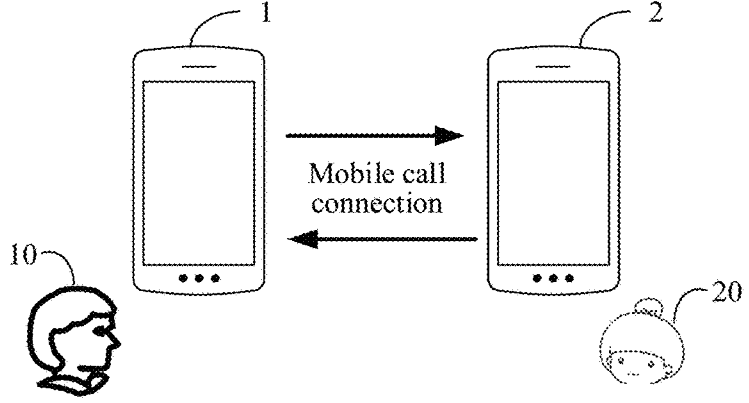
FIG. 1A is a schematic diagram showing an architecture of a communications system according to an embodiment of this application.

This application proposes a mobile call method. The method is applied to an electronic device (for example, a first electronic device). The first electronic device supports a mobile communications network. The first electronic device may establish a mobile call connection with another electronic device (for example, a third electronic device) that also supports the mobile communications network. By using the mobile call connection, the first electronic device may perform a mobile call with the third electronic device.

The first electronic device may have a preset call function, and the first electronic device may further support short-range wireless communication. For example, the short-range wireless communication may be any one of Bluetooth, wireless fidelity (wireless fidelity, Wi-Fi), near field communication (near field communication, NFC), and the like. The preset call function of the first electronic device is used to support performing a mobile call with another electronic device (for example, the third electronic device) on an electronic device (for example, a second electronic device) by using a mobile call service of the first electronic device. The preset call function may also be referred to as a synchronous call function, a super call function, or the like. This is not limited in this embodiment of this application.

Some electronic devices (for example, the second electronic device) also have the preset call function, and the second electronic device further supports short-range wireless communication. The preset call function of the second electronic device is used to support performing a mobile call with another electronic device (for example, the third electronic device) on the second electronic device by using a mobile call service of an electronic device (for example, the first electronic device). The second electronic device may not support the mobile communications network, or the second electronic device may support the mobile communications network.

The first electronic device may transfer a mobile call of the first electronic device to the second electronic device by using the preset call function of the first electronic device and the second electronic device, and a short-range wireless communication technology connection between the first electronic device and the second electronic device. In this way, a user can not only answer or make a call by using the first electronic device, but also answer a call from the first electronic device by using the second electronic device or control the second electronic device to make a call.

For example, the first electronic device and the third electronic device may be any electronic device that supports a mobile communications network, such as a mobile phone, a tablet computer, or a watch phone. The second electronic device may be an electronic device that supports short-range wireless communication and has an audio function, such as a mobile phone, a tablet computer, a television set, a smart speaker, a smart watch, a notebook computer, a desktop computer, or a smart headset. For example, in the following embodiment, that the first electronic device is a mobile phone 1, the second electronic device is a tablet computer 3, and the third electronic device is a mobile phone 2 is used as an example to describe the method in this embodiment of this application.

Figure 1B:
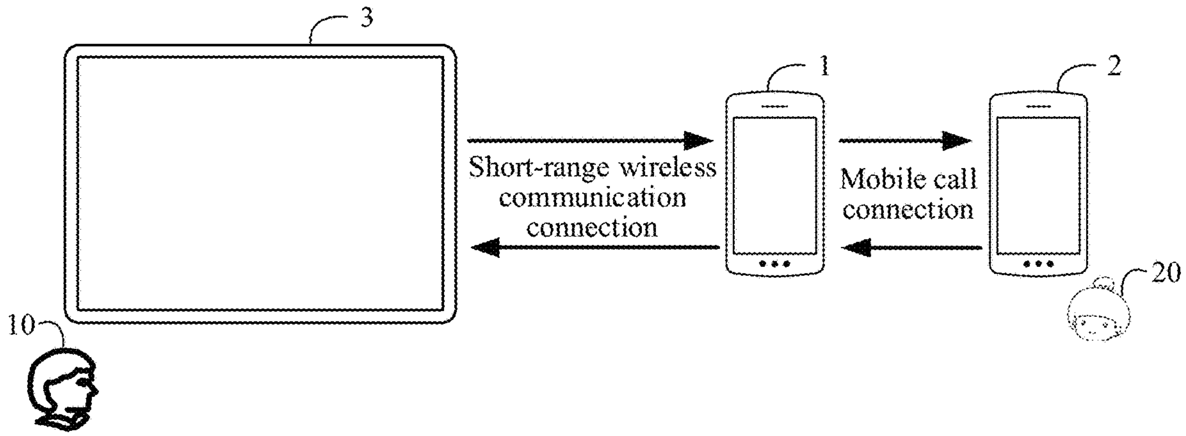
FIG. 1B is a schematic diagram showing an architecture of another communications system according to an embodiment of this application.

Generally, as shown in FIG. 1A, after the mobile phone 1 establishes a mobile call connection with the mobile phone 2, a user 10 may use the mobile phone 1 to perform a voice call with a user 20 that uses the mobile phone 2. In this embodiment of this application, as shown in FIG. 1B, the mobile phone 1 may further establish a short-range wireless communication technology connection with the tablet computer 3. The mobile phone 1 may transfer a mobile call of the mobile phone 1 to the tablet computer 3 over the short-range wireless communication technology connection by using a preset call function of the mobile phone 1 and the tablet computer 3. In this way, the user 10 may use the tablet computer 3 to perform a voice call with the user 20 that uses the mobile phone 2 through the mobile phone 1.

The preset call function of the mobile phone 1 is used as an example. The preset call function of the mobile phone 1 may be a system function embedded in the mobile phone 1, or may be a function provided by a third-party application.

Figure 2:
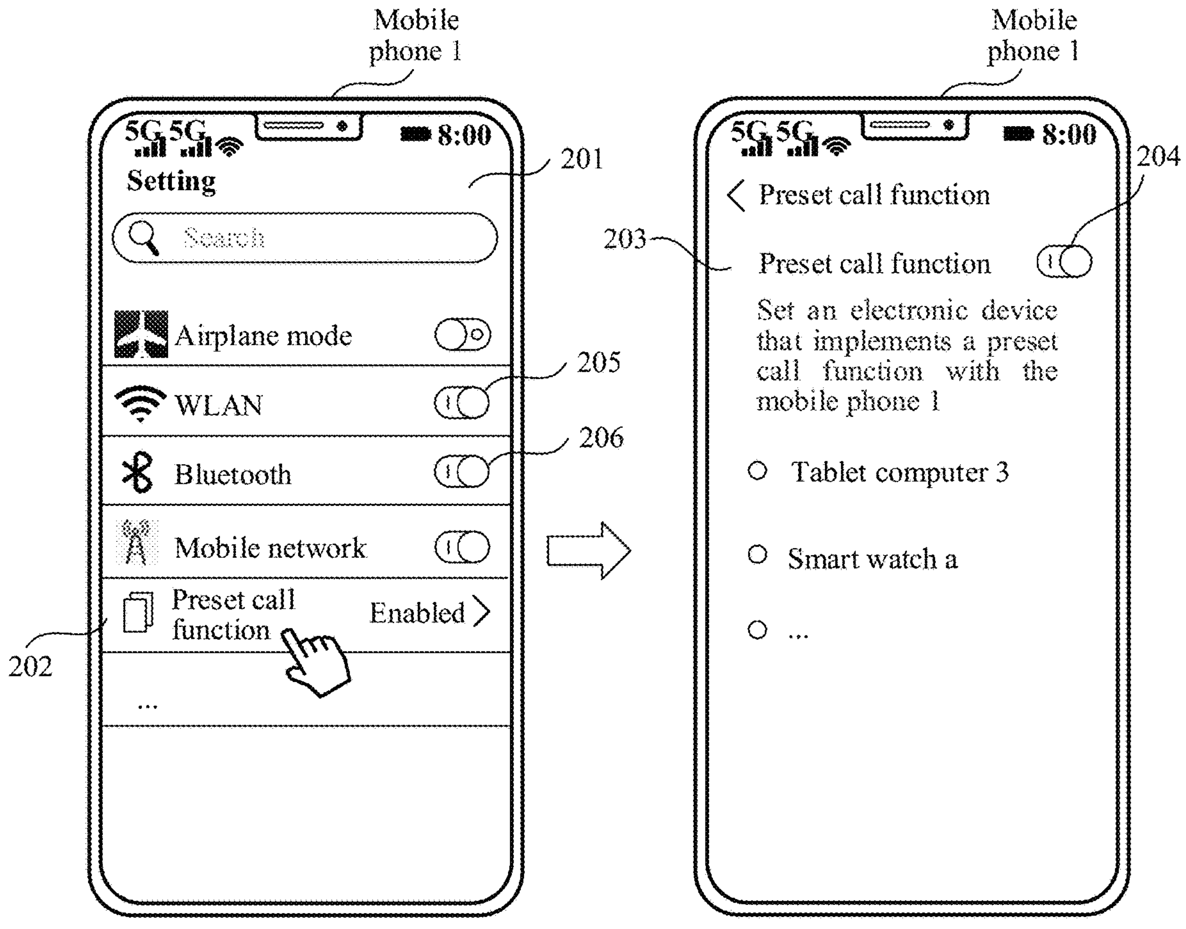
FIG. 2 is a schematic diagram showing a setting interface of an electronic device according to an embodiment of this application.

For example, the preset call function is a system function embedded in the mobile phone 1. Referring to FIG. 2, FIG. 2 shows a setting interface 201 of the mobile phone 1. The setting interface 201 includes a setting option 202 of the preset call function. The mobile phone 1 may display a setting interface 203 for the preset call function shown in FIG. 2 in response to a triggering operation performed by the user on the setting option 202 of the preset call function on the setting interface 201. The setting interface 203 includes a switch 204 of the preset call function. The switch 204 is configured to enable or disable the preset call function. After the preset call function of the mobile phone 1 is enabled, as shown in FIG. 2, the mobile phone 1 may display, on the setting interface 203, an identifier of one or more electronic devices (such as a smart watch a and the tablet computer 3) that support implementing the preset call function with the mobile phone 1. The mobile phone 1 may support the user to select, from the one or more electronic devices, an electronic device (for example, the tablet computer 3) that implements the foregoing preset call function with the mobile phone 1. Then, when the mobile phone 1 receives a call from another device (for example, the mobile phone 2) or the mobile phone 1 requests to make a voice call with another device (for example, the mobile phone 2), the mobile phone 1 may support, by using the short-distance wireless communication technology connection between the mobile phone 1 and the tablet computer 3, the user 10 to use the tablet computer 3 to perform a mobile call with the user 20 that uses the mobile phone 2.

The setting interface 1 shown in FIG. 2 further includes a switch 205 of a wireless local area network (wireless local area networks, WLAN) function (for example, a wireless fidelity (wireless fidelity, Wi-Fi) network) and a switch 206 of a Bluetooth function. The switch 205 is configured to enable or disable a Wi-Fi function, and the switch 206 is configured to enable or disable the Bluetooth function.

In some embodiments, the one or more electronic devices that support implementing the preset call function with the mobile phone 1 may include: an electronic device that has the preset call function and a short-range wireless communication function, where the preset call function and the short-range wireless communication function are enabled.

In some other embodiments, the one or more electronic devices that support implementing the preset call function with the mobile phone 1 may include: an electronic device that logs in to a same account with the mobile phone 1 and has the preset call function and the short-range wireless communication function, where the preset call function and the short-range wireless communication function are enabled. For example, the account may be an account registered with a cloud server of a manufacturer of the electronic device. Alternatively, when the preset call function is a function provided by a third-party application, the account may be an account used to log in to the third-party application.

Similarly, the preset call function of the tablet computer 3 may be a system function embedded in the tablet computer 3, or may be a function provided by a third-party application. For a specific method for setting the preset call function in the tablet computer 3, refer to the descriptions of setting the preset call function in the mobile phone 1 in the foregoing embodiment. Details are not described herein again. Certainly, an electronic device that is allowed to implement the preset call function with the tablet computer 3, for example, the mobile phone 1, may also be set on the tablet computer 3. For a specific setting method, refer to a method for setting, on the mobile phone 1, an electronic device that is allowed to implement the preset call function with the mobile phone 1. Details are not described herein again in this embodiment of this application.

It may be learned from the foregoing description that the mobile phone 1 may transfer the mobile call of the mobile phone 1 to the tablet computer 3 over the short-range wireless communication technology connection between the mobile phone 1 and the tablet computer 3 by using the preset call function of the mobile phone 1 and the tablet computer 3. That is, the user may answer or make a call by using the mobile phone 1, or may answer a call from the mobile phone 1 by using the tablet computer 3, or may use the tablet computer 3 to control the mobile phone 1 to make a call.

In a related technology, based on the preset call function, in a process in which the tablet computer 3 performs a mobile call with the mobile phone 2 by using a call service of the mobile phone 1, if the short-range wireless communication technology connection between the mobile phone 1 and the tablet computer 3 is unstable, or the preset call function in the mobile phone 1 or the tablet computer 3 is disabled, the mobile call between the mobile phone 1 and the mobile phone 2 ends (that is, the call is disconnected). In this case, the mobile call is easily disconnected by mistake because the short-range wireless communication technology connection between the mobile phone 1 and the tablet computer 3 is unstable or the user disables the preset call function in the mobile phone 1 or the tablet computer 3 by mistake. This affects call experience of the user.

Based on this, an embodiment of this application provides a mobile call method. In the method, in a process in which the tablet computer 3 uses the mobile call service of the mobile phone 1 to perform a mobile call with the mobile phone 2, the mobile phone 1 does not directly disconnect the mobile call between the mobile phone 1 and the mobile phone 2 in response to events such as the short-range wireless communication technology connection between the mobile phone 1 and the tablet computer 3 is unstable, and the preset call function in the mobile phone 1 or the tablet computer 3 is disabled. Instead, the mobile phone 1 stops performing the mobile call with the mobile phone 2 by using the tablet computer 3, and the mobile phone 1 continues the mobile call with the mobile phone 2. In this way, a possibility that the mobile call is disconnected by mistake can be reduced, and call experience of the user can be improved.

Figure 3:
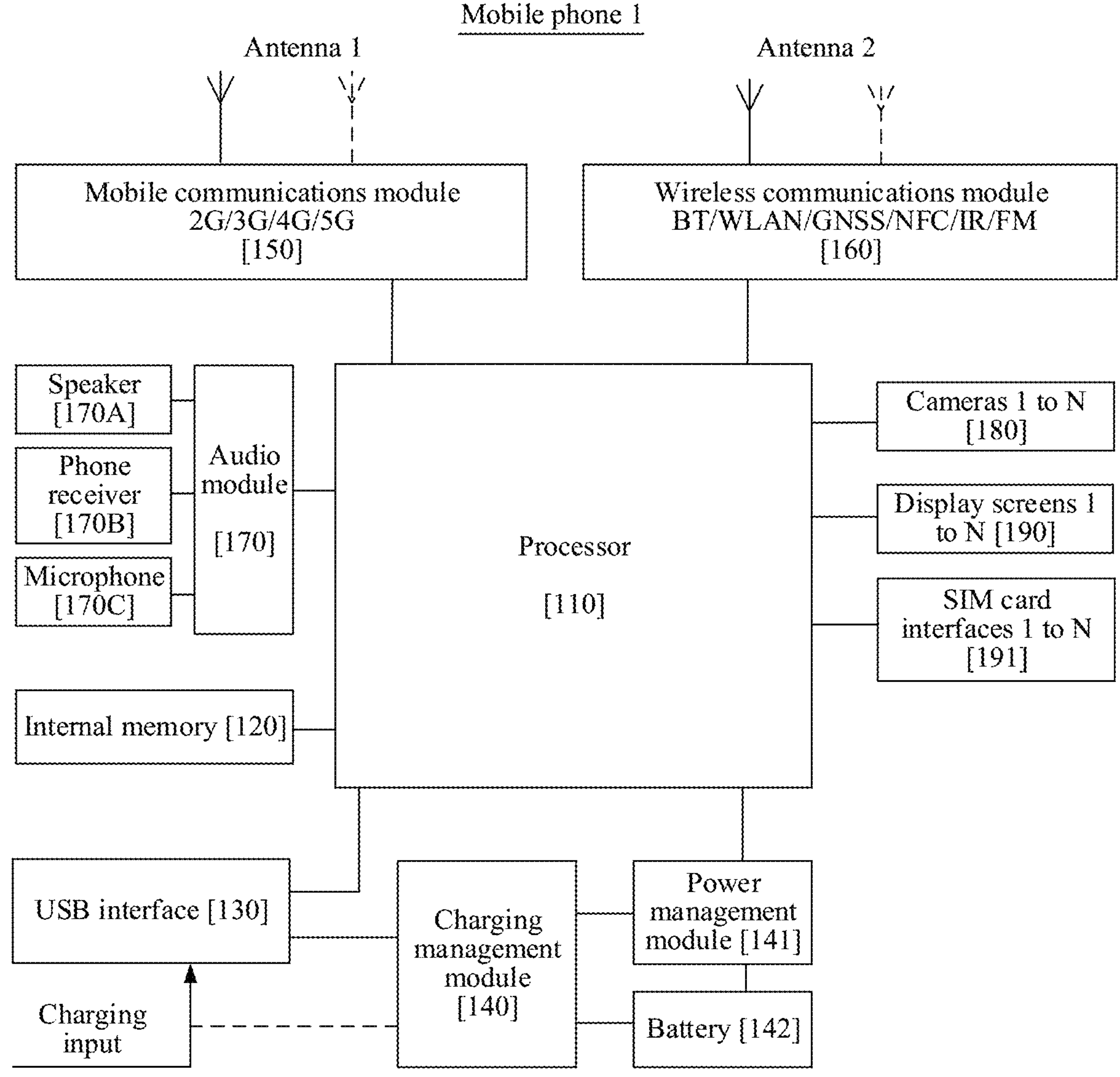
FIG. 3 is a schematic structural diagram of an electronic device according to an embodiment of this application.

FIG. 3 is a schematic structural diagram of an electronic device according to an embodiment of this application. An electronic device 100 shown in FIG. 3 may be the foregoing mobile phone 1. In this embodiment, that the electronic device 100 is the mobile phone 1 is used as an example for description. As shown in FIG. 3, the mobile phone 1 may include: a processor 110, an internal memory 120, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a phone receiver 170B, a microphone 170C, a camera 180, a display screen 190, a subscriber identity module (subscriber identification module, SIM) card interface 191, and the like.

It can be understood that the structure illustrated in this embodiment does not constitute a specific limitation on the mobile phone 1. In some other embodiments of this application, the mobile phone 1 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the mobile phone 1. The controller may generate an operation control signal according to instruction operation code and a time-sequence signal, and control obtaining and executing of instructions.

A memory may also be disposed in the processor 110, and is configured to store instructions and data. In some embodiments, the memory in the processor 110 is a cache memory. The memory may store instructions or data recently used or cyclically used by the processor 110.

In some embodiments, the processor 110 may include one or more interfaces. The interfaces may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

It can be understood that the interface connection relationships between the modules illustrated in this embodiment are merely illustrative descriptions, and do not constitute a structural limitation on the mobile phone 1. In some other embodiments, the mobile phone 1 may also adopt an interface connection manner different from that in the foregoing embodiment, or adopt a combination of a plurality of interface connection manners.

The charging management module 140 is configured to receive charging input from a charger. While charging the battery 142, the charging management module 140 may also supply power to the electronic device by using the power management module 141.

The power management module 141 is configured to connect to the battery 142, the charging management module 140, and the processor 110. The power management module 141 receives input from the battery 142 and/or the charging management module 140, and supplies power to the processor 110, the internal memory 120, an external memory, the display screen 190, the camera 180, the wireless communications module 160, and the like. The power management module 141 may be further configured to monitor parameters such as a battery capacity, a battery cycle count, and a battery health state (leakage and impedance). In some other embodiments, the power management module 141 may be alternatively disposed in the processor 110. In some other embodiments, the power management module 141 and the charging management module 140 may also be disposed in a same device.

A wireless communication function of the mobile phone 1 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. The mobile communications module 150 may provide a solution to wireless communication such as 2G/3G/4G/5G applied to the mobile phone 1. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and send the electromagnetic wave to the modem processor for demodulation. The mobile communications module 150 may further amplify a signal modulated by the modem processor, and convert the signal into an electromagnetic wave by using the antenna 1 for radiation. In some embodiments, at least some of functional modules of the mobile communications module 150 may be disposed in the processor 110. In some embodiments, at least some of the functional modules of the mobile communications module 150 may be disposed in a same device as at least some of modules of the processor 110.

The modem processor may include a modulator and a demodulator. In some embodiments, the modem processor may be an independent device. In some other embodiments, the modem processor may be independent of the processor 110, and is disposed in a same device as the mobile communications module 150 or another functional module.

The wireless communications module 160 may provide a solution to wireless communication including a wireless local area network (wireless local area networks, WLAN) (such as a wireless fidelity (wireless fidelity, Wi-Fi) network), Bluetooth (bluetooth, BT), and a global navigation satellite system (global navigation satellite system, GNSS), frequency modulation (frequency modulation, FM), NFC, an infrared (infrared, IR) technology, and the like to be applied to the mobile phone 1. The wireless communications module 160 may be one or more components into which at least one communication processing module is integrated. The wireless communications module 160 receives an electromagnetic wave by using the antenna 2, performs frequency modulation and filtering on the electromagnetic wave signal, and sends a processed signal to the processor 110. The wireless communications module 160 may further receive a to-be-sent signal from the processor 110, perform frequency modulation and amplification on the to-be-sent signal, and convert the to-be-sent signal into an electromagnetic wave by using the antenna 2 for radiation.

In some embodiments, in the mobile phone 1, the antenna 1 is coupled to the mobile communications module 150, and the antenna 2 is coupled to the wireless communications module 160, so that the mobile phone 1 can communicate with a network and another device by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies. The GNSS may include a global positioning system (global positioning system, GPS), a global navigation satellite system (global navigation satellite system, GLONASS), a BeiDou navigation satellite system (beidou navigation satellite system, BDS), a Quasi-Zenith satellite system (quasi-zenith satellite system, QZSS) and/or satellite-based augmentation systems (satellite based augmentation systems, SBAS). For example, in this embodiment of this application, the mobile phone 1 may establish a Bluetooth connection with the tablet computer 3 by using the wireless communications module 160 and a wireless communication technology, for example, Bluetooth (BT). Based on the established Bluetooth connection, the mobile phone 1 may send audio data to the tablet computer 3, and may also receive audio data from the tablet computer 3. For another example, in this embodiment of this application, the mobile phone 1 may establish a Wi-Fi connection with the tablet computer 3 by using the wireless communications module 160 and a wireless communication technology, for example, wireless local area network (WLAN). Based on the established Wi-Fi connection, the mobile phone 1 may send audio data to the tablet computer 3, and may receive audio data from the tablet computer 3.

The mobile phone 1 implements a display function by using the GPU, the display screen 190, the application processor, and the like. The GPU is a microprocessor for image processing and connects the display screen 190 and the application processor. The processor 110 may include one or more GPUs that execute program instructions to generate or change display information.

The display screen 190 is configured to display images and videos. The display screen 190 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, and quantum dot light emitting diodes (quantum dot light emitting diodes, QLED). In some embodiments, the mobile phone 1 may include one or N display screens 190, where N is a positive integer greater than 1.

The mobile phone 1 may implement a shooting function by using the ISP, the camera 180, the video codec, the GPU, the display screen 190, the application processor, and the like.

The ISP is configured to process data fed back by the camera 180. In some embodiments, the ISP may be disposed in the camera 180. The camera 180 is configured to capture a still image or video. In some embodiments, the mobile phone 1 may include one or N cameras 180, where N is a positive integer greater than 1. The video codec is configured to compress or decompress a digital video. The mobile phone 1 may support one or more types of video codecs.

The internal memory 120 may be configured to store computer-executable program code. The executable program code includes instructions. The processor 110 runs the instructions stored in the internal memory 120, to perform various function applications and data processing of the mobile phone 1. For example, in this embodiment of this application, the processor 110 may establish a Bluetooth connection with the tablet computer 3 by using the wireless communications module 160 by executing the instructions stored in the internal memory 120, and perform short-range data exchange with the tablet computer 3, so as to implement functions such as a call by using the tablet computer 3. The internal memory 120 may include a program storage region and a data storage region. The program storage region may store an operating system, an application program required by at least one function (such as a voice playing function and an image playing function), and the like. The data storage region may store data (such as audio data and contacts) that is created in a process of using the mobile phone 1. In addition, the internal memory 120 may include a high-speed random access memory, and may also include a non-volatile memory, such as at least one magnetic disk memory, a flash memory, or a universal flash storage (universal flash storage, UFS). In this embodiment of this application, after a Bluetooth connection is established between the mobile phone 1 and the tablet computer 3 by using a wireless communication technology, for example, Bluetooth, the mobile phone 1 may store a Bluetooth address of the tablet computer 3 in the internal memory 120.

The mobile phone 1 may implement an audio function such as music playing and recording by using the audio module 170, the speaker 170A, the phone receiver 170B, the microphone 170C, the application processor, and the like.

The audio module 170 is configured to convert digital audio information into analog audio signal output, and is also configured to convert analog audio input into a digital audio signal. The audio module 170 may be further configured to encode and decode audio signals. In some embodiments, the audio module 170 may be disposed in the processor 110, or some functional modules in the audio module 170 are disposed in the processor 110.

The speaker 170A, also referred to as "horn", is configured to convert an electrical audio signal into a sound signal. Music can be listened to or a hands-free call can be answered by using the speaker 170A in the mobile phone 1.

The telephone receiver 170B, also referred to as "handset", is configured to convert an electrical audio signal into a sound signal. When the mobile phone 1 answers a call or receives voice information, the phone receiver 170B may be put close to a human ear to receive voice.

The microphone 170C, also referred to as "voice tube" or "mike", is configured to convert a sound signal into an electrical signal. When making a call or sending voice information, a user may make a sound approaching the microphone 170C through the mouth of the user, to input a sound signal into the microphone 170C. At least one microphone 170C may be disposed in the mobile phone 1. In some other embodiments, two microphones 170C may be disposed in the mobile phone 1, to collect a sound signal and implement a noise reduction function. In some other embodiments, three, four, or more microphones 170C may be alternatively disposed in the mobile phone 1, to collect a sound signal, reduce noise, recognize a sound source, implement a directional recording function, and the like.

The SIM card interface 191 is configured to connect a SIM card. The SIM card may be inserted into the SIM card interface 191 or plugged out from the SIM card interface 191, to come into contact with or be separated from the mobile phone 1. The mobile phone 1 may support one or N SIM card interfaces, where N is a positive integer greater than 1. The mobile phone 1 interacts with a network by using the SIM card, to implement functions such as a call and data communication.

The mobile call method in the following embodiment may be implemented in the electronic device 100 having the foregoing hardware structure.

The embodiments of this application provide a mobile call method. In the following embodiment, the method in this embodiment of this application is described by using an example in which the first electronic device is the mobile phone 1 shown in FIG. 1B, the second electronic device is the tablet computer 3 shown in FIG. 1B, and the third electronic device is the mobile phone 2 shown in FIG. 1B.

Both the mobile phone 1 and the tablet computer 3 support short-range wireless communication. As shown in FIG. 1B, a short-range wireless communication technology connection is established between the mobile phone 1 and the tablet computer 3. The short-range wireless communication technology connection may be a Bluetooth connection and/or a Wi-Fi connection. Certainly, the short-range wireless communication technology connection between the mobile phone 1 and the tablet computer 3 includes but is not limited to the foregoing Bluetooth connection and the foregoing Wi-Fi connection. The short-range wireless communication technology connection in this embodiment of this application may also be another type of wireless communication technology connection. For a method for establishing the short-range wireless communication technology connection between the mobile phone 1 and the tablet computer 3, refer to related descriptions in conventional technologies. Details are not described herein again in this embodiment of this application.

After a short-range wireless communication function is enabled in both the mobile phone 1 and the tablet computer 3, the mobile phone 1 and the tablet computer 3 may establish the short-range wireless communication technology connection.

The mobile phone 1 and the tablet computer 3 may establish only one type of short-distance wireless communication technology connection (for example, a first wireless communication connection), and may also establish two types of short-range wireless communication technology connections (for example, the first wireless communication connection and a second wireless communication connection). The first wireless communication connection is different from the second wireless communication connection. For example, the first wireless communication connection is a Wi-Fi connection, and the second wireless communication connection is a Bluetooth connection. Alternatively, the second wireless communication connection is a Wi-Fi connection, and the first wireless communication connection is a Bluetooth connection. In the following embodiment, the method in this embodiment of this application is described by using an example in which the first wireless communication connection between the mobile phone 1 and the tablet computer 3 is a Wi-Fi connection, and the second wireless communication connection is a Bluetooth connection.

The mobile phone 1 and the mobile phone 2 support a mobile communications network. The mobile communications network is used to implement communication between a mobile subscriber and a fixed-line subscriber or between mobile subscribers. For example, by using the mobile communications network, the mobile phone 1 and the mobile phone 2 may establish a mobile call connection. Based on the mobile call connection, the mobile phone 1 and the mobile phone 2 may perform a mobile call. The mobile call may be a voice call or a video call. In some embodiments, the tablet computer 3 may not support the mobile communications network, but the tablet computer 3 may use a mobile call service of the mobile phone 1 to perform a mobile call with the mobile phone 2 by using a preset call function. In some other embodiments, the tablet computer 3 may also support the mobile communications network, and the tablet computer 3 may use the mobile call service of the mobile phone 1 to perform a mobile call with the mobile phone 2 through the preset call function.

Figure 4A:
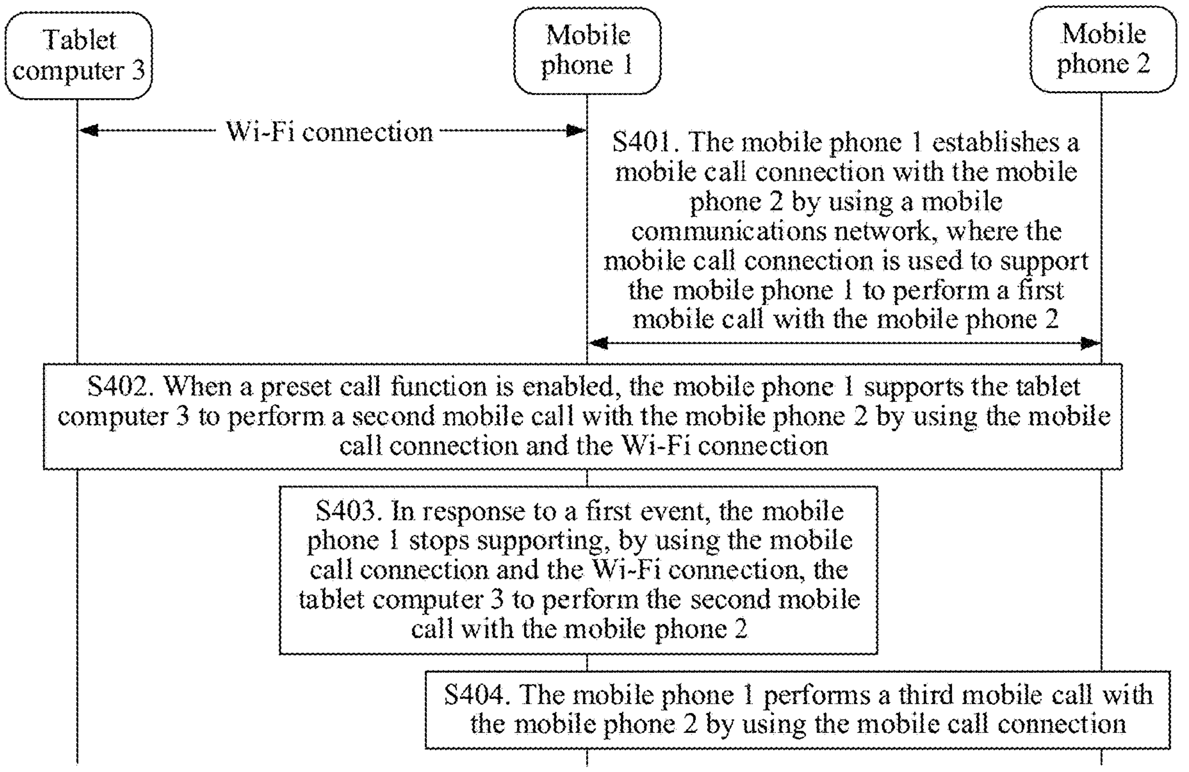
FIG. 4A is a schematic flowchart of a mobile call method according to an embodiment of this application.

FIG. 4A is a schematic flowchart of a mobile call method according to an embodiment of this application. In this embodiment, a Wi-Fi connection is established between the mobile phone 1 and the tablet computer 3. Referring to FIG. 4A, FIG. 4A is the flowchart of the mobile call method according to this embodiment. The method may include S401 to S404.

S401. The mobile phone 1 establishes a mobile call connection with the mobile phone 2 by using a mobile communications network, where the mobile call connection is used to support the mobile phone 1 to perform a first mobile call with the mobile phone 2.

In some embodiments, the mobile phone 1 may call the mobile phone 2, and request to establish the mobile call connection with the mobile phone 2. Alternatively, the mobile phone 2 may call the mobile phone 1, and request to establish the mobile call connection with the mobile phone 1. For a method for establishing the mobile call connection between the mobile phone 1 and the mobile phone 2 by using the mobile communications network, refer to descriptions in conventional technologies. Details are not described herein again in this embodiment of this application.

In some embodiments, a type of the first mobile call between the mobile phone 1 and the mobile phone 2 may be a video call or a voice call. When the call type of the first mobile call is a video call, the mobile phone 1 may send audio data and video data to the mobile phone 2 by using the mobile call connection, and the mobile phone 1 may also receive the audio data and the video data from the mobile phone 2. When the call type of the first mobile call is a voice call, the mobile phone 1 may send audio data to the mobile phone 2 by using the mobile call connection, and the mobile phone 1 may also receive audio data from the mobile phone 2.

S402. When a preset call function is enabled, the mobile phone 1 supports, by using the mobile call connection and a Wi-Fi connection, the tablet computer 3 to perform a second mobile call with the mobile phone 2.

The preset call function is used to support performing a mobile call with another electronic device (for example, the mobile phone 2) on the tablet computer 3 by using a mobile call service of the mobile phone 1. After the mobile phone 1 and the tablet computer 3 are powered on, the preset call function may be automatically enabled, or the user may manually enable the preset call function. After the preset call function is enabled for both the mobile phone 1 and the tablet computer 3, the mobile phone 1 may transfer the foregoing first mobile call to the tablet computer 3, and support, by using the mobile call connection and the Wi-Fi connection, the tablet computer 3 to perform a mobile call with the mobile phone 2, that is, the foregoing second mobile call.

In some embodiments, the user 10 receives a call from the mobile phone 2 on the mobile phone 1, or after the user 10 makes a voice call to the mobile phone 2 on the mobile phone 1 and the voice call is connected, the mobile phone 1 supports, by using the mobile call connection and the Wi-Fi connection, the tablet computer 3 to perform the second mobile call with the mobile phone 2, that is, the foregoing S402.

In some other embodiments, the mobile phone 1 may receive a mobile call request from the mobile phone 2 after the Wi-Fi connection is established between the mobile phone 1 and the tablet computer 3, and the preset call function is enabled for both the mobile phone 1 and the tablet computer 3. In this case, the mobile call request may be transferred from the mobile phone 1 to the tablet computer 3 for reminding. A reminder of the mobile call request is simultaneously displayed on the mobile phone 1 and the tablet computer 3. The user 10 may directly receive a call corresponding to the mobile call request on the tablet computer 3, and may also enter the state described in the foregoing S402. After the Wi-Fi connection is established between the mobile phone 1 and the tablet computer 3, and the preset call function is enabled for both the mobile phone 1 and the tablet computer 3, when receiving the mobile call request from the mobile phone 2, the mobile phone 1 may display a reminder (such as a ring reminder or a vibration reminder) of the mobile call request on only the tablet computer 3 or may display a reminder of the mobile call request on both the mobile phone 1 and the tablet computer 3.

In some other embodiments, after the Wi-Fi connection is established between the mobile phone 1 and the tablet computer 3, and the preset call function is enabled for both the mobile phone 1 and the tablet computer 3, the user 10 may also enter the state described in the foregoing S402 after the user 10 directly makes a voice call to the mobile phone 2 by using the mobile call service of the mobile phone 1 on the tablet computer 3, and the voice call is connected.

Figure 4B:
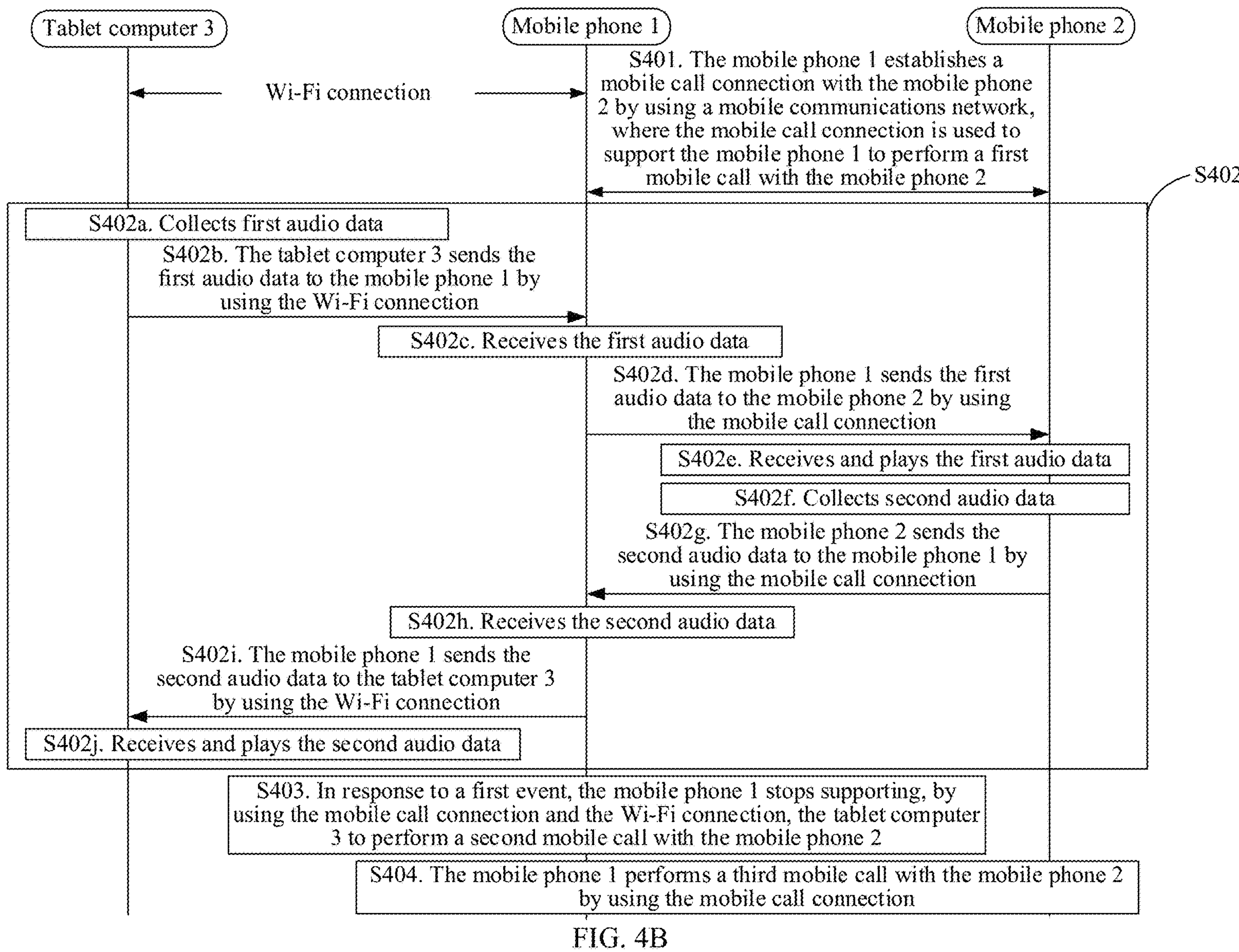
FIG. 4B is a schematic flowchart of a mobile call method according to another embodiment of this application.

As shown in FIG. 4B, S402 may specifically include S402*a* to S402*j*.

S402*a*. The tablet computer 3 collects first audio data.

S402*b*. The tablet computer 3 sends the first audio data to the mobile phone 1 by using the Wi-Fi connection.

S402*c*. The mobile phone 1 receives the first audio data.

S402*d*. The mobile phone 1 sends the first audio data to the mobile phone 2 by using the mobile call connection.

S402*e*. The mobile phone 2 receives and plays the first audio data.

In some embodiments, that the tablet computer 3 collects first audio data may specifically include that: The tablet computer 3 collects an analog audio signal in real time, and performs analog-to-digital conversion on the analog audio signal to obtain a digital audio signal. In this embodiment, in S402*b*, the first audio data sent by the tablet computer 3 to the mobile phone 1 by using the Wi-Fi connection is a digital audio signal. In S402*c*, the first audio data received by the mobile phone 1 is a digital audio signal.

In this embodiment, after receiving the first audio data by performing S402*c*, the mobile phone 1 may directly forward the first audio data to the mobile phone 2 by using the mobile call connection. After receiving the first audio data (that is, the digital audio signal), the mobile phone 2 may perform digital-to-analog conversion on the digital audio signal to obtain an analog audio signal, and then play the analog audio signal.

In some other embodiments, that the tablet computer 3 collects first audio data may specifically include that: The tablet computer 3 collects an analog audio signal in real time. In this embodiment, in S402*b*, the first audio data sent by the tablet computer 3 to the mobile phone 1 by using the Wi-Fi connection is an analog audio signal.

In this embodiment, after receiving the first audio data by performing S402*c*, the mobile phone 1 may perform analog-to-digital conversion on the analog audio signal to obtain a digital audio signal. In S402*d*, the first audio data sent by the mobile phone 1 to the mobile phone 2 by using the mobile call connection is a digital audio signal. In S402*e*, after receiving the first audio data (that is, the digital audio signal), the mobile phone 2 may perform digital-to-analog conversion on the digital audio signal to obtain an analog audio signal, and then play the analog audio signal.

S402*f*. The mobile phone 2 collects second audio data.

S402*g*. The mobile phone 2 sends the second audio data to the mobile phone 1 by using the mobile call connection.

S402*h*. The mobile phone 1 receives the second audio data.

S402*i*. The mobile phone 1 sends the second audio data to the tablet computer 3 by using the Wi-Fi connection.

S402*j*. The tablet computer 3 receives and plays the second audio data.

In some embodiments, that the mobile phone 2 collects second audio data may specifically include that: The mobile phone 2 collects an analog audio signal in real time, and performs analog-to-digital conversion on the analog audio signal to obtain a digital audio signal. In this embodiment, in S402*g*, the second audio data sent by the mobile phone 2 to the mobile phone 1 by using the mobile call connection is a digital audio signal. In S402*h*, the second audio data received by the mobile phone 1 is a digital audio signal.

In some embodiments, after receiving the second audio data by performing S402*h*, the mobile phone 1 may directly forward the second audio data to the tablet computer 3 by using the Wi-Fi connection. After receiving the second audio data (that is, the digital audio signal), the tablet computer 3 may perform digital-to-analog conversion on the digital audio signal to obtain an analog audio signal, and then play the analog audio signal.

In this embodiment, after receiving the second audio data by performing S402*h*, the mobile phone 1 may perform digital-to-analog conversion on the digital audio signal to obtain an analog audio signal. In S402*i*, the second audio data sent by the mobile phone 1 to the tablet computer 3 by using the Wi-Fi connection is an analog audio signal. In S402*j*, after receiving the second audio data (that is, the analog audio signal), the tablet computer 3 may directly play the analog audio signal.

It should be noted that, in this embodiment of this application, S402*a* to S402*e* and S402*f* to S402*j* may be simultaneously performed, or S402*a* to S402*e* may be performed before S402*f* to S402*j*, or S402*f* to S402*j* may be performed before S402*a* to S402*e*. An execution sequence of S402*a* to S402*e* and S402*f* to S402*j* is not limited in this embodiment of this application.

In some embodiments, the call type of the second mobile call is a voice call. When the call type of the first mobile call between the mobile phone 1 and the mobile phone 2 is a voice call, the mobile phone 1 may directly transfer the voice call to the tablet computer 3, and the tablet computer 3 performs a voice call with the mobile phone 2. When the call type of the first mobile call is a video call, the mobile phone 1 transfers the video call to the tablet computer 3, and may automatically downgrade the video call to a voice call.

In some other embodiments, if the call type of the first mobile call is a video call, the user may further select whether the second mobile call between the tablet computer 3 and the mobile phone 2 is a voice call or a video call. Specifically, the mobile phone 1 may send prompt information (for example, third prompt information), where the third prompt information is used to request the user to select the call type of the second mobile call. The mobile phone 1 may determine, in response to a selection operation 1 of the user on the third prompt information, that the call type of the second mobile call is a video call. The mobile phone 1 determines, in response to a selection operation 2 of the user on the third prompt information, that the call type of the second mobile call is a voice call.

Figure 4C:
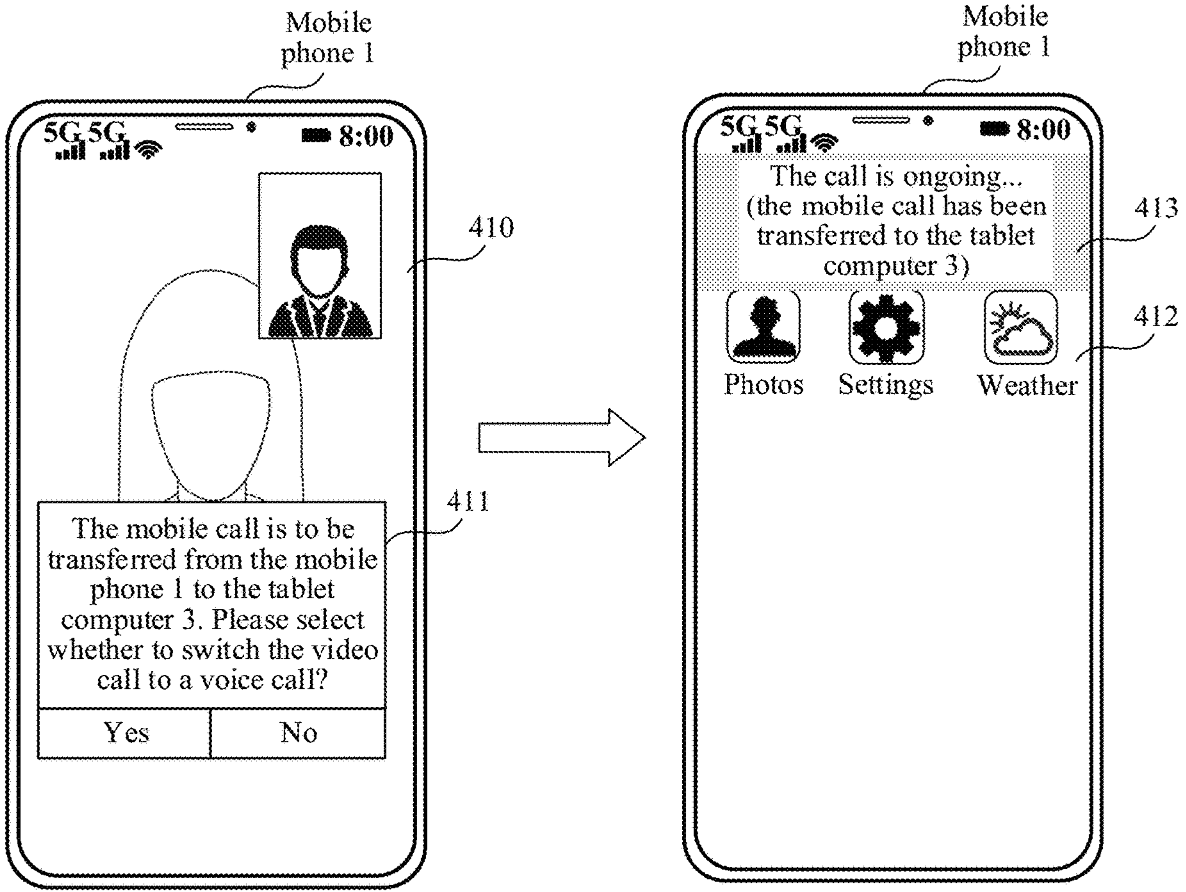
FIG. 4C is a schematic diagram displaying third prompt information according to an embodiment of this application.

For example, the mobile phone 1 may display a video call interface 410 shown in FIG. 4C. The video call interface 410 includes third prompt information 411, for example, "The mobile call is to be transferred from the mobile phone 1 to the tablet computer 3. Please select whether to switch the video call to a voice call?". The third prompt information 411 may further include a "Yes" option and a "No" option. The foregoing selection operation 1 may be a click operation performed by the user on the "No" option. The foregoing selection operation 2 may be a click operation performed by the user on the "Yes" option.

Further, the mobile phone 1 forwards the mobile call to the tablet computer 3 in response to a click operation of the user 10 on the "Yes" option or the "No" option in the third prompt information 411. Then, the mobile phone 1 may display a main interface 412 shown in FIG. 4C. The main interface 412 includes fourth prompt information 413, where the fourth prompt information 413 is used to prompt the user 10 that is the call is ongoing and the mobile call has been transferred to the tablet computer 3.

Figure 4D:
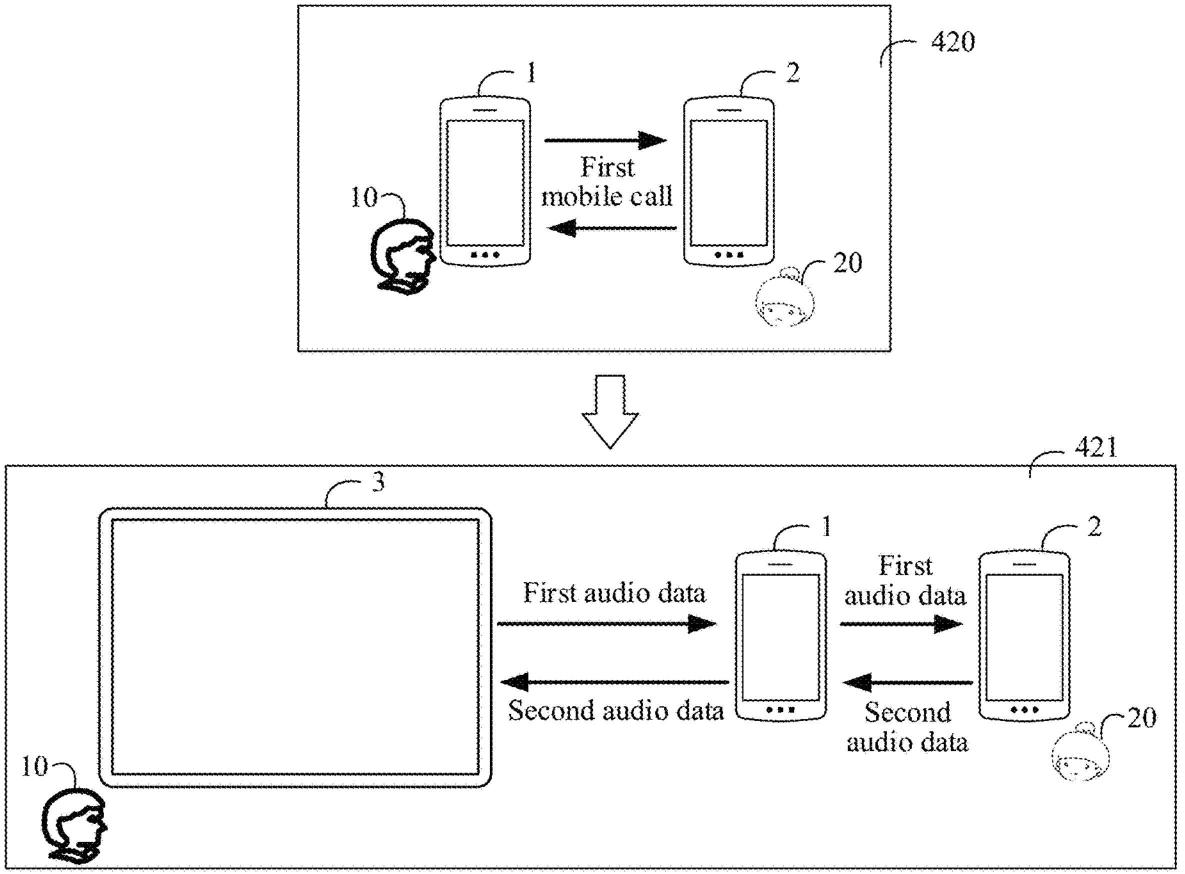
FIG. 4D is a schematic diagram showing a scenario of a mobile call method according to an embodiment of this application.

In some embodiments, after the mobile phone 1 performs S401, a scenario shown by 420 in FIG. 4D occurs. After the mobile phone 1 performs S402, a scenario shown by 421 in FIG. 4D occurs. Specifically, in the scenario shown by 421 in FIG. 4D, the mobile phone 1 receives the first audio data sent from the tablet computer 3, and sends the first audio data to the mobile phone 2. The mobile phone 1 further receives the second audio data sent by the mobile phone 2, and sends the second audio data to the tablet computer 3.

S403. In response to a first event, the mobile phone 1 stops supporting, by using the mobile call connection and the Wi-Fi connection, the tablet computer 3 to perform the second mobile call with the mobile phone 2.

For example, the foregoing first event may be at least one of the following events: the preset call function in the mobile phone 1 or the tablet computer 3 is disabled; the Wi-Fi function in the mobile phone 1 or the tablet computer 3 is disabled; signal strength of the Wi-Fi connection between the mobile phone 1 and the tablet computer 3 is less than a first strength threshold.

It should be understood that if the preset call function in the mobile phone 1 or the tablet computer 3 is disabled, it indicates that the mobile phone 1 can no longer implement the mobile call function of the mobile phone 1 on the tablet computer 3 by using the preset call function in the mobile phone 1 and the tablet computer 3.

Figure 4E:
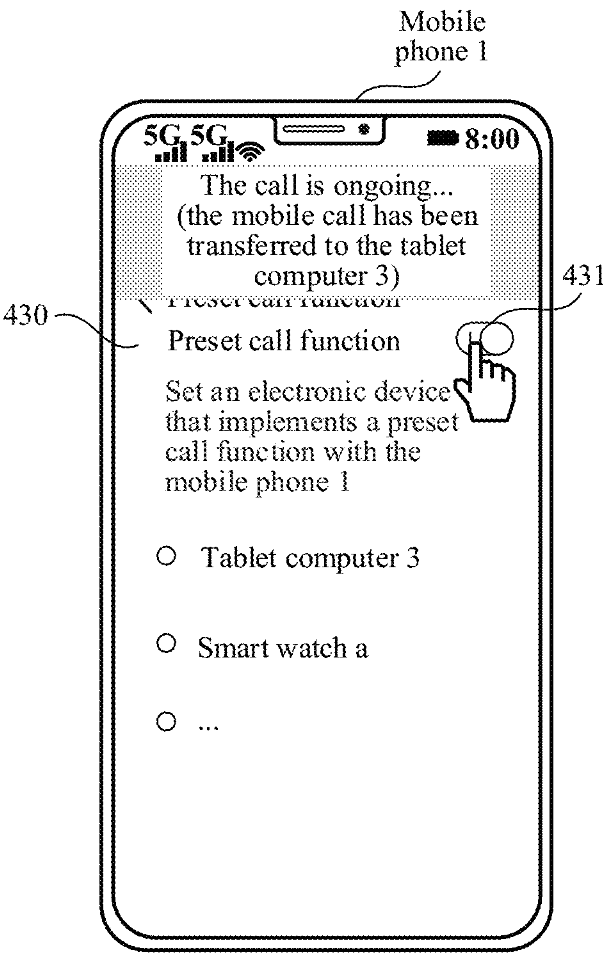
FIG. 4E is a schematic diagram displaying that a preset call function in a mobile phone 1 is disabled according to an embodiment of this application.

In some embodiments, the preset call function in the mobile phone 1 is disabled. Specifically, as shown in FIG. 4E, the user 10 triggers a switch 431 of the preset call function in a preset call function setting interface 430 of the mobile phone 1. In response to this triggering operation, the mobile phone 1 disables the preset call function in the mobile phone 1.

That the preset call function in the tablet computer 3 is disabled may be specifically that the tablet computer 3 disables the preset call function in the tablet computer 3 in response to a triggering operation of the user 10 on a switch of the preset call function in the tablet computer 3.

In some possible embodiments, after disabling the preset call function, the tablet computer 3 may send a first indication message to the mobile phone 1, where the first indication message is used to indicate that the preset call function in the tablet computer 3 is disabled. In this embodiment, that in response to a first event, the mobile phone 1 stops supporting, by using the mobile call connection and the Wi-Fi connection, the tablet computer 3 to perform the second mobile call with the mobile phone 2 may be specifically that: In response to receiving the first indication message, the mobile phone 1 stops supporting, by using the mobile call connection and the Wi-Fi connection, the tablet computer 3 to perform the second mobile call with the mobile phone 2.

If the Wi-Fi function in the mobile phone 1 or the tablet computer 3 is disabled, it indicates that the mobile phone 1 and the tablet computer 3 can no longer use the Wi-Fi connection to transmit the first audio data and the second audio data. That is, the mobile phone 1 can no longer implement the mobile call function of the mobile phone 1 on the tablet computer 3 by using the preset call function and the Wi-Fi function in the mobile phone 1 and the tablet computer 3.

Figure 4F:
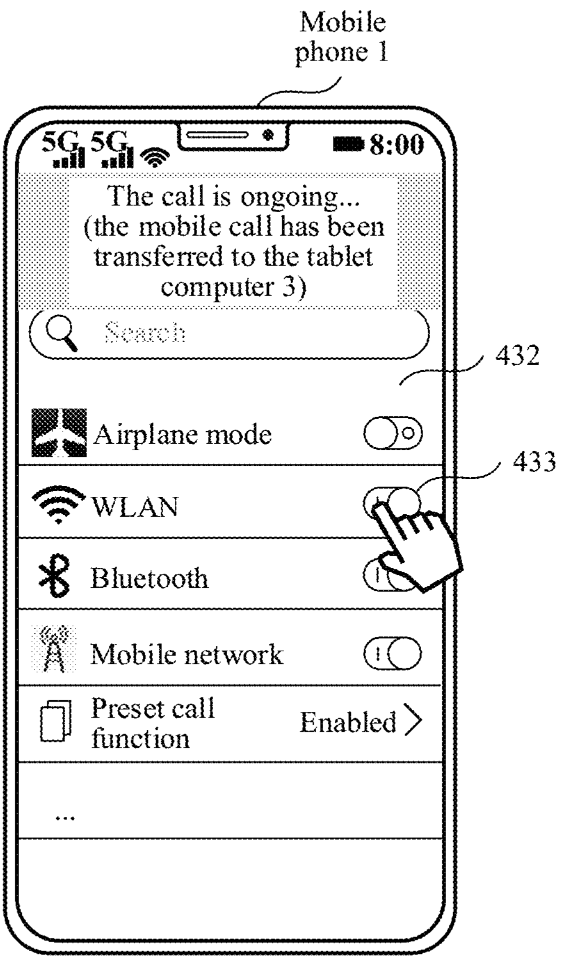
FIG. 4F is a schematic diagram displaying that a Wi-Fi function in the mobile phone 1 is disabled according to an embodiment of this application.

In some embodiments, the Wi-Fi function in the mobile phone 1 is disabled. Specifically, as shown in FIG. 4F, the user 10 triggers a switch 433 of the Wi-Fi function in a setting interface 432 of the mobile phone 1. In response to this triggering operation, the mobile phone 1 disables the Wi-Fi function in the mobile phone 1.

In some other embodiments, that the Wi-Fi function in the tablet computer 3 is disabled may be specifically that the tablet computer 3 disables the preset call function in the tablet computer 3 in response to a triggering operation of the user 10 on the switch of the Wi-Fi function in the tablet computer 3. In some possible embodiments, after disabling the Wi-Fi function in the tablet computer 3, the tablet computer 3 sends a second indication message to the mobile phone 1, where the second indication message is used to indicate that the Wi-Fi function in the tablet computer 3 is disabled. In this embodiment, that in response to a first event, the mobile phone 1 stops supporting, by using the mobile call connection and the Wi-Fi connection, the tablet computer 3 to perform the second mobile call with the mobile phone 2 may be specifically that: In response to receiving the second indication message, the mobile phone 1 stops supporting, by using the mobile call connection and the Wi-Fi connection, the tablet computer 3 to perform the second mobile call with the mobile phone 2.

If the signal strength of the Wi-Fi connection between the mobile phone 1 and the tablet computer 3 is less than the first strength threshold, it indicates that a Wi-Fi signal between the mobile phone 1 and the tablet computer 3 has poor quality. In this case, even if the mobile phone 1 can implement the mobile call function of the mobile phone 1 on the tablet computer 3 by using the preset call function and the Wi-Fi function in the mobile phone 1 and the tablet computer 3, call quality of the user cannot be ensured. It can be understood that the first wireless communication connection is a Wi-Fi connection, and the first strength threshold is a Wi-Fi signal strength threshold.

Figure 4G:
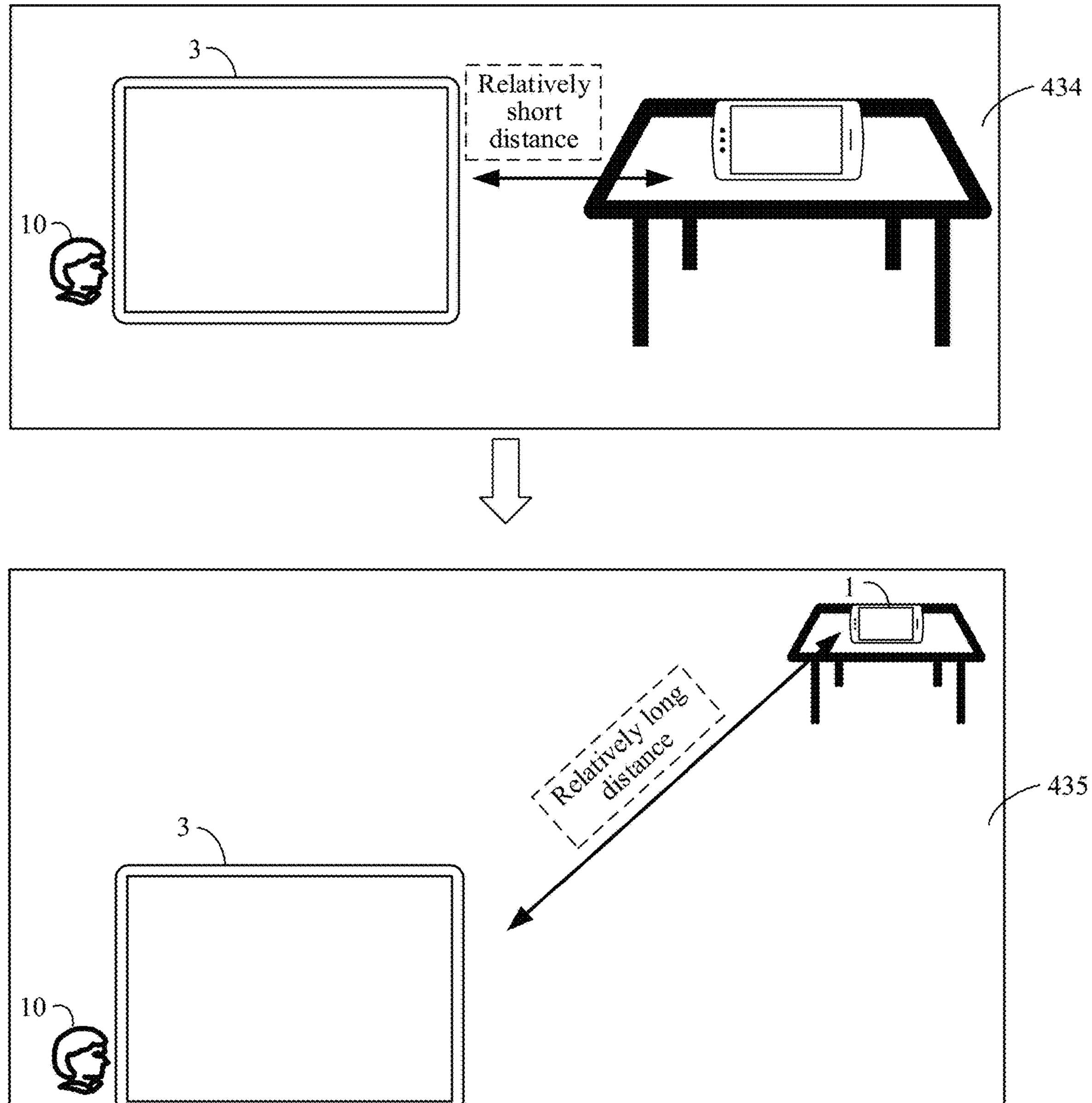
FIG. 4G is a schematic diagram showing a scenario of a mobile call method according to another embodiment of this application.

In some embodiments, the signal strength of the Wi-Fi connection between the mobile phone 1 and the tablet computer 3 is affected by a distance between the mobile phone 1 and the tablet computer 3. Specifically, as shown in FIG. 4G, when the user 10 uses the tablet computer 3 to perform the first mobile call with the mobile phone 2 by using the mobile call service of the mobile phone 1, the user 10 may move while carrying the tablet computer 3. When the tablet computer 3 carried by the user 10 is relatively close to the mobile phone 1 (for example, a scenario 434 in FIG. 4G), the signal strength of the Wi-Fi connection between the mobile phone 1 and the tablet computer 3 is greater than the first strength threshold. When the user 10 carries the tablet computer 3 to a location that is relatively far from the mobile phone 1 (for example, a scenario 435 in FIG. 4G), the signal strength of the Wi-Fi connection between the mobile phone 1 and the tablet computer 3 may be less than the first strength threshold. When the distance between the mobile phone 1 and the tablet computer 3 is too long, the signal strength of the Wi-Fi connection is less than the first strength threshold. In response to the first event, the mobile phone 1 may stop supporting, by using the mobile call connection and the Wi-Fi connection, the tablet computer 3 to perform the second mobile call with the mobile phone 2.

In conclusion, when the foregoing first event occurs, the mobile phone 1 cannot implement the mobile call function of the mobile phone 1 on the tablet computer 3. Alternatively, the mobile phone 1 can implement the mobile call function of the mobile phone 1 on the tablet computer 3, but call quality of the user cannot be ensured. In this case, to ensure that the user 10 can normally perform a mobile call with the user 20, the mobile phone 1 may stop supporting, by using the mobile call connection and the Wi-Fi connection, the tablet computer 3 to perform the second mobile call with the mobile phone 2. Instead, the mobile phone 1 performs S404, that is, the mobile phone 1 directly performs a mobile call with the mobile phone 2 by using the mobile call connection.

In this embodiment, that the mobile phone 1 stops supporting, by using the mobile call connection and the Wi-Fi connection, the tablet computer 3 to perform the second mobile call with the mobile phone 2 may specifically include that: The mobile phone 1 no longer receives the first audio data that is from the tablet computer 3 and collected by the tablet computer 3, or sends the second audio data from the mobile phone 2 to the tablet computer 3.

Figure 4H:
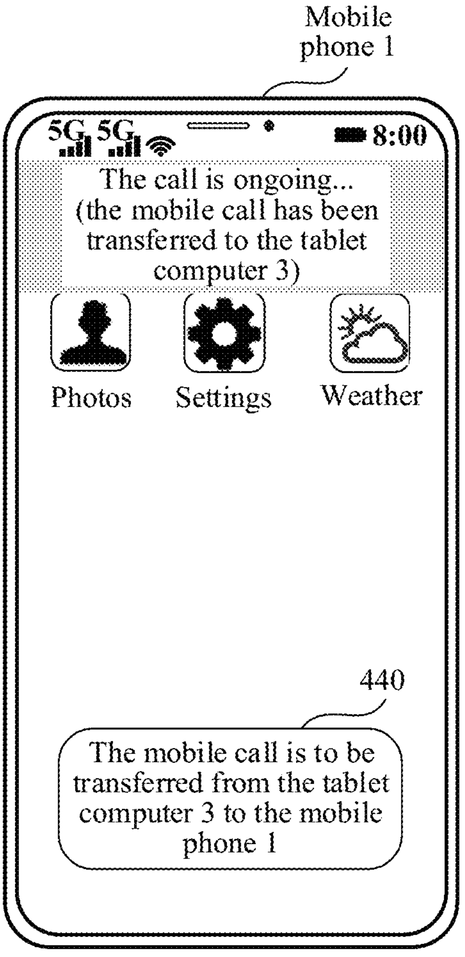
FIG. 4H is a schematic diagram displaying first prompt information according to an embodiment of this application.

In some other embodiments, the mobile phone 1 may further send first prompt information in response to the first event. The first prompt information is used to prompt the user that the mobile call between the mobile phone 1 and the mobile phone 2 is to be transferred from the tablet computer 3 to the mobile phone 1. For example, the mobile phone 1 may display first prompt information 440 shown in FIG. 4H, for example, "The mobile call is to be transferred from the tablet computer 3 to the mobile phone 1".

Figure 4I:
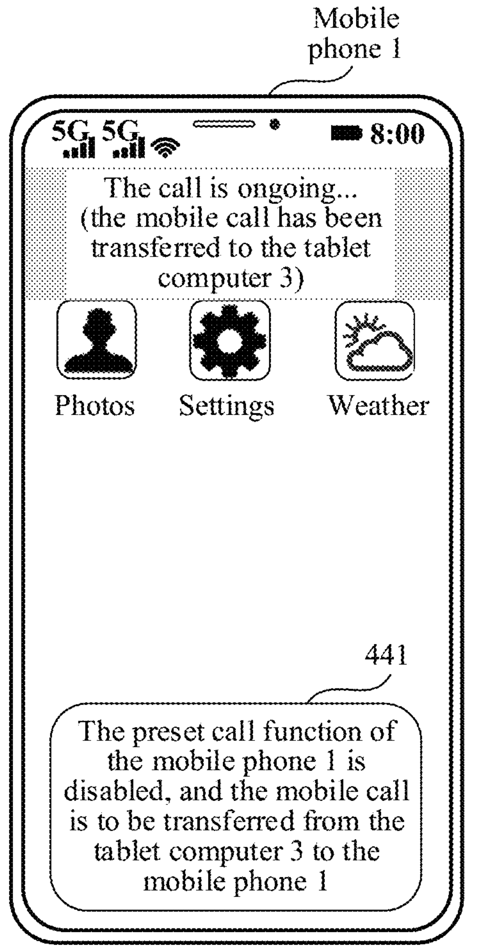
FIG. 4I is a schematic diagram displaying first prompt information according to another embodiment of this application.
Figure 4I:
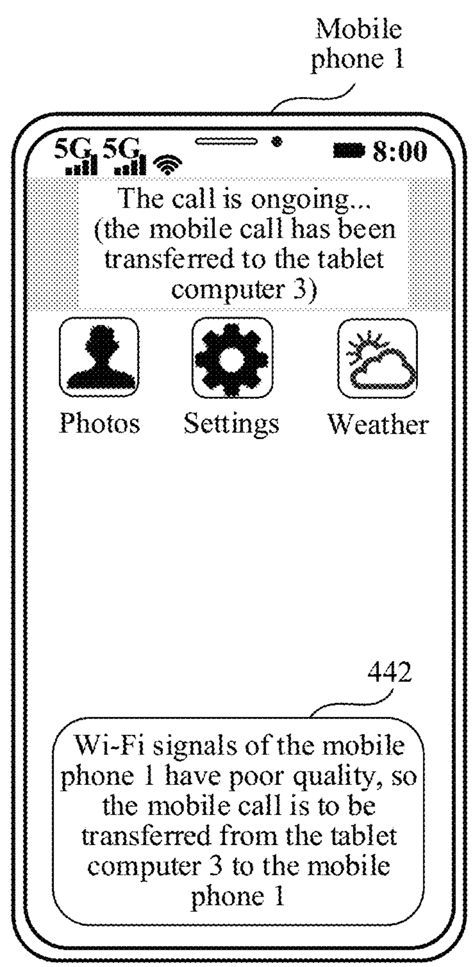

In some other embodiments, the foregoing first prompt information may further include a reason why the mobile call is to be transferred from the tablet computer 3 to the mobile phone 1. For example, the mobile phone 1 may display first prompt information 441 shown in FIG. 4I, for example, "The preset call function of the mobile phone 1 is disabled, and the mobile call is to be transferred from the tablet computer 3 to the mobile phone 1". For another example, the mobile phone 1 may display first prompt information 442 shown in FIG. 4I, for example, "Wi-Fi signals of the mobile phone 1 have poor quality, so the mobile call is to be transferred from the tablet computer 3 to the mobile phone 1".

It can be understood that the first prompt information 440, the first prompt information 441, and the first prompt information 442 are all displayed on the mobile phone 1. In some other embodiments, in response to the first event, the mobile phone 1 may also send the foregoing first prompt information to the tablet computer 3, where the first prompt information is used to be displayed on the tablet computer 3. Alternatively, in some other embodiments, the first prompt information may be simultaneously displayed on the mobile phone 1 and the tablet computer 3.

S404. The mobile phone 1 performs a third mobile call with the mobile phone 2 by using the mobile call connection.

For a specific method in which the mobile phone 1 performs the second mobile call with the mobile phone 2 by using the mobile call connection, refer to related descriptions in conventional technologies. Details are not described herein again.

Figure 4J:
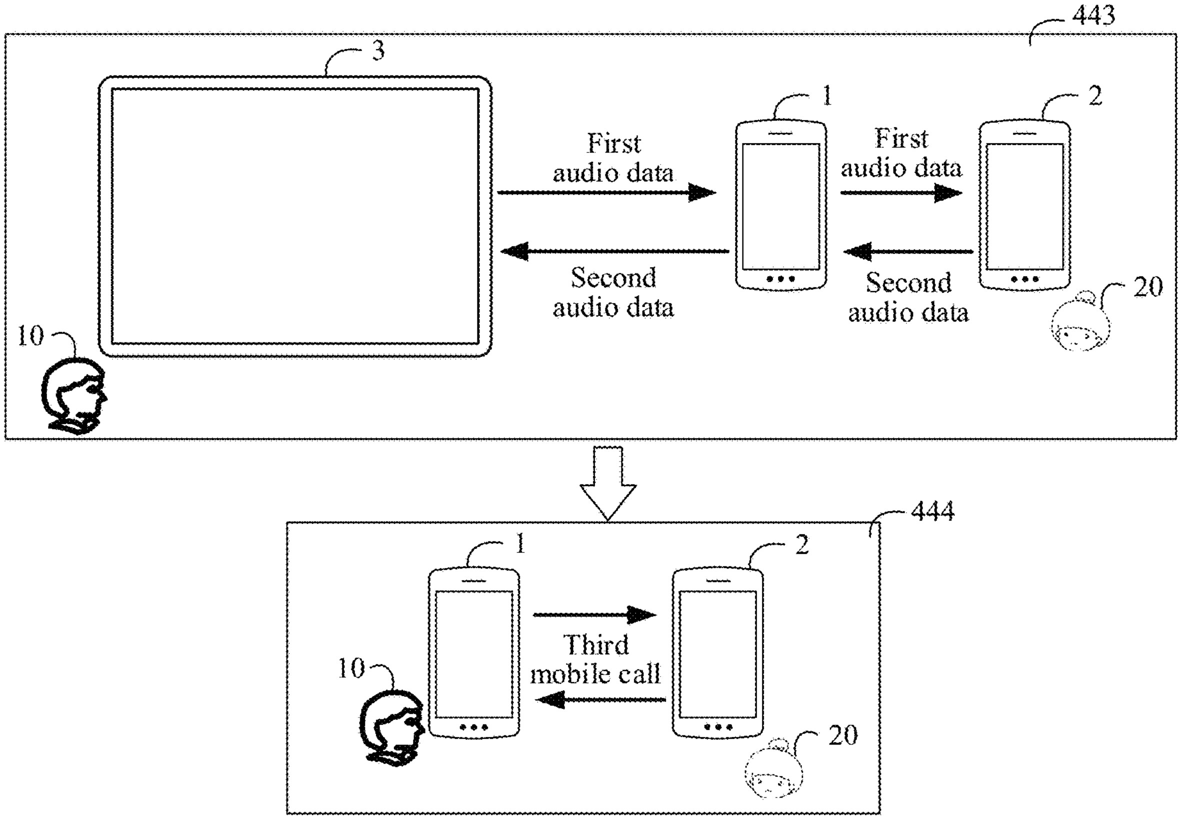
FIG. 4J is a schematic diagram showing a scenario of a mobile call method according to another embodiment of this application.

In some embodiments, when the mobile phone 1 performs S402, a scenario shown by 443 in FIG. 4J occurs. After the mobile phone 1 performs S403 and S404, a scenario shown by 444 in FIG. 4J occurs. As shown in the scenario 444, the mobile phone 1 no longer uses the tablet computer 3 to perform the second mobile call with the mobile phone 2. Instead, the mobile phone 1 directly performs the third mobile call with the mobile phone 2.

In some embodiments, when the call type of the first mobile call is a voice call, the third mobile call is a voice call. When the call type of the first mobile call is a video call, the third mobile call is a voice call or a video call.

In some other embodiments, if the call type of the first mobile call is a video call, the user may further select whether the third mobile call performed between the mobile phone 1 and the mobile phone 2 is a voice call or a video call. Specifically, the mobile phone 1 may send prompt information (for example, second prompt information), where the second prompt information is used to request the user to select the call type of the third mobile call. The mobile phone 1 may determine, in response to a first selection operation of the user on the second prompt information, that the call type of the third mobile call is a video call. The mobile phone 1 determines, in response to a second selection operation of the user on the third prompt information, that the call type of the third mobile call is a voice call.

Figure 4K:
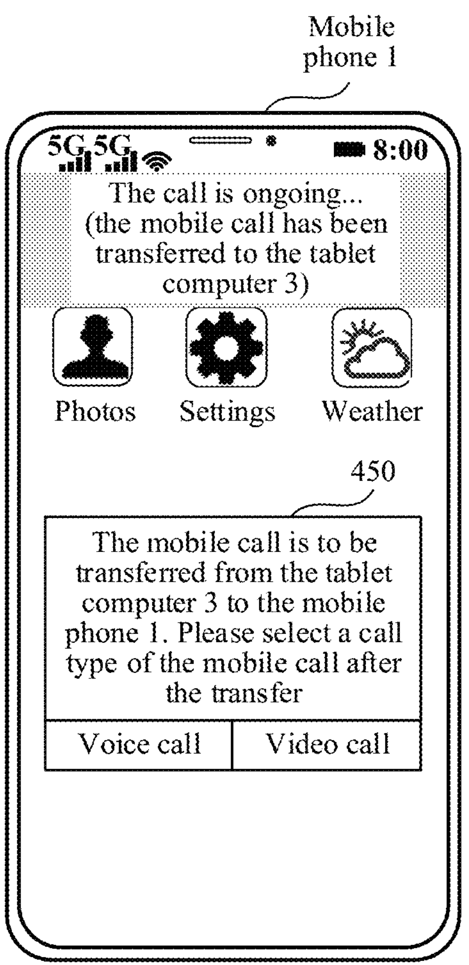
FIG. 4K is a schematic diagram displaying second prompt information according to an embodiment of this application.

For example, the mobile phone may display second prompt information 450 shown in FIG. 4K, for example, "The mobile call is to be transferred from the mobile phone 1 to the tablet computer 3. Please select a call type of the mobile call after the transfer". The second prompt information 450 may further include a "Voice call" option and a "Video call" option. The foregoing first selection operation may be a click operation performed by the user on the "Video call" option. The foregoing second selection operation may be a click operation performed by the user on the "Voice call" option.

It can be understood that the foregoing second prompt information 450 is displayed on the mobile phone 1. In some other embodiments, the mobile phone 1 may also instruct the tablet computer 3 to send the foregoing second prompt information, where the second prompt information is displayed on the tablet computer 3. Alternatively, in some other embodiments, the second prompt information may be simultaneously displayed on the mobile phone 1 and the tablet computer 3.

In some other embodiments, if the call type of the first mobile call is a video call, the call type of the third mobile call may be preset by the user 10. For example, the user 10 may preset in the mobile phone 1 that the third mobile call is a video call when the first mobile call is a video call. In this case, when the mobile phone 1 performs the third mobile call with the mobile phone 2 by using the mobile call connection, the call type of the third mobile call may be set to a video call. Certainly, the user 10 may also set the call type of the third mobile call to a voice call.

In the technical solution provided in this embodiment of this application, if the preset call function is enabled for both the mobile phone 1 and the tablet computer 3, the mobile phone 1 may transfer the first mobile call between the mobile phone 1 and the mobile phone 2 to the tablet computer 3 by using the mobile call connection and the Wi-Fi connection. The tablet computer 3 performs the second mobile call with the mobile phone 2 by using the first wireless connection between the tablet computer 3 and the mobile phone 1 and the mobile call connection between the mobile phone 1 and the mobile phone 2. In a process of performing the foregoing second mobile call, if the mobile phone 1 detects the first event, it indicates that the mobile phone 1 cannot implement the mobile call function of the mobile phone 1 on the tablet computer 3. Alternatively, the mobile phone 1 can implement the mobile call function of the mobile phone 1 on the tablet computer 3, but call quality of the user cannot be ensured. In this case, the mobile phone 1 may transfer the mobile call from the tablet computer 3 to the mobile phone 1 instead of directly disconnecting the mobile call between the mobile phone 1 and the mobile phone 2. In this way, a case in which the mobile call between the mobile phone 1 and the mobile phone 2 is disconnected by mistake can be reduced, and call experience of the user is improved.

It can be learned from the foregoing description that only one type of short-range wireless communication technology connection, such as a Wi-Fi connection or a Bluetooth connection, or two different types of short-range wireless communication technology connections, such as a Wi-Fi connection and a Bluetooth connection, may be established between the mobile phone 1 and the tablet computer 3.

For example, the first wireless communication connection is a Wi-Fi connection and the second wireless communication connection is a Bluetooth connection. In a process in which the mobile phone 1 supports, by using the Wi-Fi connection and the mobile call connection, the tablet computer 3 to perform the second mobile call with the mobile phone 2, if the Wi-Fi connection is unavailable, the mobile phone 1 may further switch from using the Wi-Fi connection to using the Bluetooth connection to support the tablet computer 3 to perform the second mobile call with the mobile phone 2. That the Wi-Fi connection is unavailable may specifically include that the Wi-Fi function in the mobile phone 1 or the tablet computer 3 is disabled, or the signal strength of the Wi-Fi connection is less than the first strength threshold. That is, when the first event is that the Wi-Fi function in the mobile phone 1 or the tablet computer 3 is disabled, or the signal strength of the Wi-Fi connection is less than the first strength threshold, the mobile phone 1 may switch to supporting, by using the mobile call connection and the Bluetooth connection, the tablet computer 3 to perform the second mobile call with the mobile phone 2.

Figure 5A:
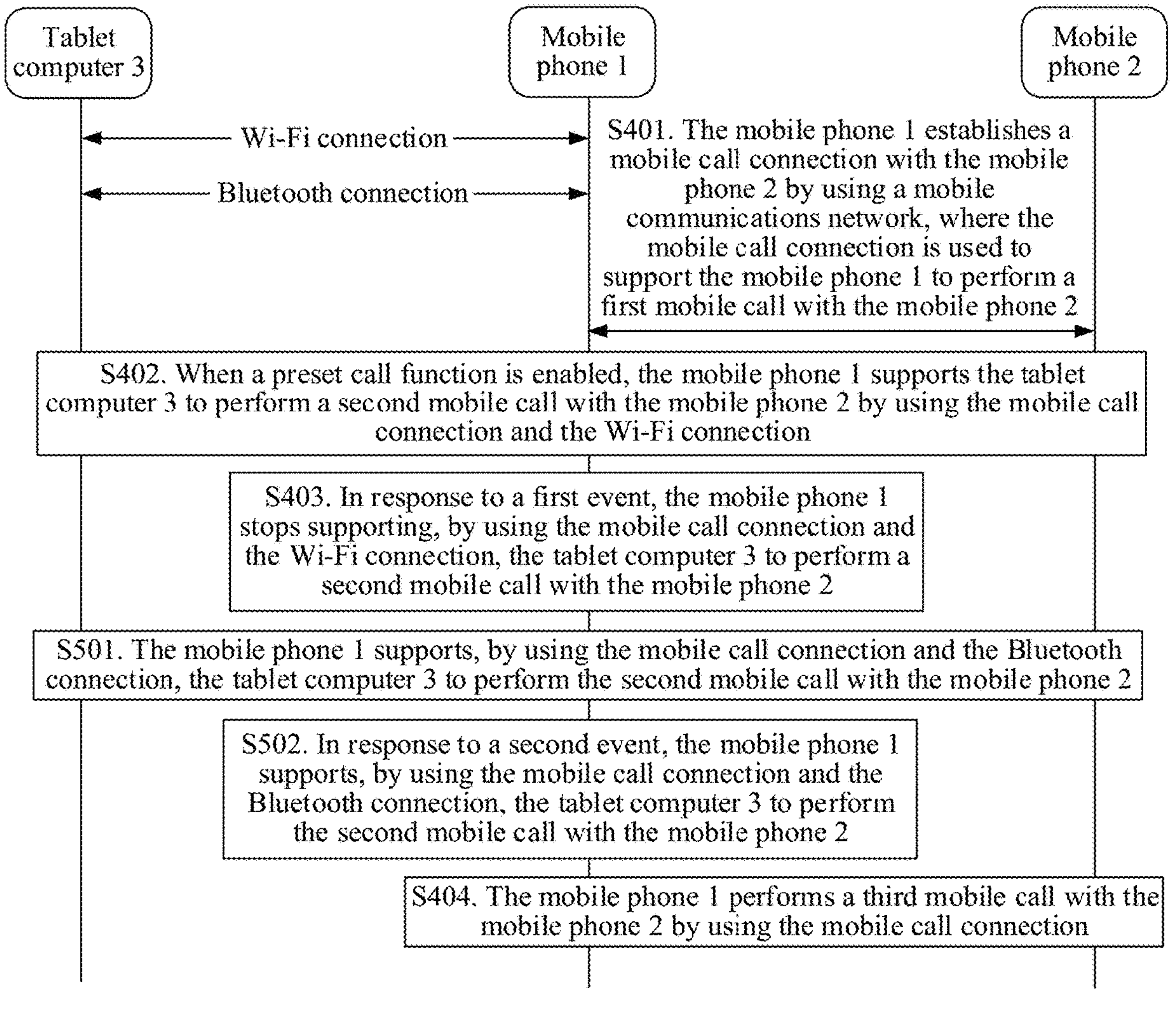
FIG. 5A is a schematic flowchart of a mobile call method according to another embodiment of this application.

Referring to FIG. 5A, FIG. 5A is a flowchart of a mobile call method according to this embodiment. In this embodiment, a Wi-Fi connection and a Bluetooth connection are established between the mobile phone 1 and the tablet computer 3. After S403 and before S404, the method further includes S501 and S502.

S501. The mobile phone 1 supports, by using the mobile call connection and the Bluetooth connection, the tablet computer 3 to perform the second mobile call with the mobile phone 2.

For a method in which the mobile phone 1 supports, by using the mobile call connection and the Bluetooth connection, the tablet computer 3 to perform the second mobile call with the mobile phone 2, refer to the method in which "the mobile phone 1 supports, by using the mobile call connection and a Wi-Fi connection, the tablet computer 3 to perform a second mobile call with the mobile phone 2" in S402. Details are not described herein again in this embodiment of this application.

S502. In response to a second event, the mobile phone 1 supports, by using the mobile call connection and the Bluetooth connection, the tablet computer 3 to perform the second mobile call with the mobile phone 2.

Specifically, the second event includes at least one of the following events: the preset call function in the mobile phone 1 or the tablet computer 3 is disabled; signal strength of the Bluetooth connection is less than a second strength threshold; the Bluetooth function in the mobile phone 1 or the tablet computer 3 is disabled.

It can be learned from the foregoing embodiment that if the preset call function in the mobile phone 1 or the tablet computer 3 is disabled, the mobile phone 1 can no longer implement the mobile call function of the mobile phone 1 on the tablet computer 3 by using the preset call function in the mobile phone 1 and the tablet computer 3.

Similar to the case in which the Wi-Fi function in the mobile phone 1 or the tablet computer 3 is disabled, if the Bluetooth function in the mobile phone 1 or the tablet computer 3 is disabled, it indicates that the mobile phone 1 and the tablet computer 3 can no longer use the Bluetooth connection to transmit the first audio data and the second audio data. That is, the mobile phone 1 can no longer implement the mobile call function of the mobile phone 1 on the tablet computer 3 by using the preset call function and the Bluetooth function in the mobile phone 1 and the tablet computer 3.

Similar to the case in which the signal strength of the Wi-Fi connection is less than the first strength threshold, if the signal strength of the Bluetooth connection between the mobile phone 1 and the tablet computer 3 is less than the second strength threshold, it indicates that a Bluetooth signal between the mobile phone 1 and the tablet computer 3 has relatively poor quality. In this case, even if the mobile phone 1 can implement the mobile call function of the mobile phone 1 on the tablet computer 3 by using the preset call function and the Bluetooth function in the mobile phone 1 and the tablet computer 3, call quality of the user cannot be ensured. It can be understood that the second wireless communication connection is a Bluetooth connection, and the second strength threshold is a Bluetooth signal strength threshold.

In conclusion, when the foregoing second event occurs, the mobile phone 1 cannot implement the mobile call function of the mobile phone 1 on the tablet computer 3. Alternatively, the mobile phone 1 can implement the mobile call function of the mobile phone 1 on the tablet computer 3, but call quality of the user cannot be ensured. In this case, to ensure that the user 10 can normally perform a mobile call with the user 20, the mobile phone 1 may stop supporting, by using the mobile call connection and the Bluetooth connection, the tablet computer 3 to perform the second mobile call with the mobile phone 2. Instead, the mobile phone 1 performs S404, that is, the mobile phone 1 directly performs a mobile call with the mobile phone 2 by using the mobile call connection.

In some embodiments, that the mobile phone 1 stops supporting, by using the mobile call connection and the Bluetooth connection, the tablet computer 3 to perform the second mobile call with the mobile phone 2 may specifically include that: The mobile phone 1 no longer receives the first audio data that is from the tablet computer 3 and collected by the tablet computer 3, or sends the second audio data from the mobile phone 2 to the tablet computer 3.

In the technical solution provided in this embodiment of this application, the Wi-Fi connection and the Bluetooth connection are established between the mobile phone 1 and the tablet computer 3. In a process in which the mobile phone 1 supports, by using the Wi-Fi connection and the mobile call connection, the tablet computer 3 to perform the second mobile call with the mobile phone 2, if the mobile phone 1 detects the first event, the mobile phone 1 does not directly perform the third mobile call with the mobile phone 2. Instead, the mobile phone 1 attempts to support, by using the Bluetooth connection, the tablet computer 3 to perform the second mobile call with the mobile phone 2. In a process in which the mobile phone 1 supports, by using the Bluetooth connection and the mobile call connection, the tablet computer 3 to perform the second mobile call with the mobile phone 2, if the mobile phone 1 detects the second event, it indicates that the mobile phone 1 cannot implement the mobile call function of the mobile phone 1 on the tablet computer 3. Alternatively, the mobile phone 1 can implement the mobile call function of the mobile phone 1 on the tablet computer 3, but call quality of the user cannot be ensured. In this case, the mobile phone 1 transfers the mobile call from the tablet computer 3 to the mobile phone 1. In this way, frequent transfer of the mobile call between the mobile phone 1 and the tablet computer 3 can be avoided, and call experience of the user can be improved.

In some other embodiments, when the foregoing first event is that the Wi-Fi function of the mobile phone 1 or the tablet computer 3 is disabled, or the signal strength of the Wi-Fi connection between the mobile phone 1 and the tablet computer 3 is less than the first strength threshold, after the mobile phone 1 performs S403 and before the mobile phone 1 performs S501, the mobile phone 1 may first detect whether a Bluetooth signal of the Bluetooth connection between the mobile phone 1 and the tablet computer 3 meets a communication condition. If the Bluetooth signal of the Bluetooth connection between the mobile phone 1 and the tablet computer 3 meets the communication condition, the mobile phone 1 may switch to supporting, by using the mobile call connection and the Bluetooth connection, the tablet computer 3 to perform the second mobile call with the mobile phone 2.

Figure 5B:
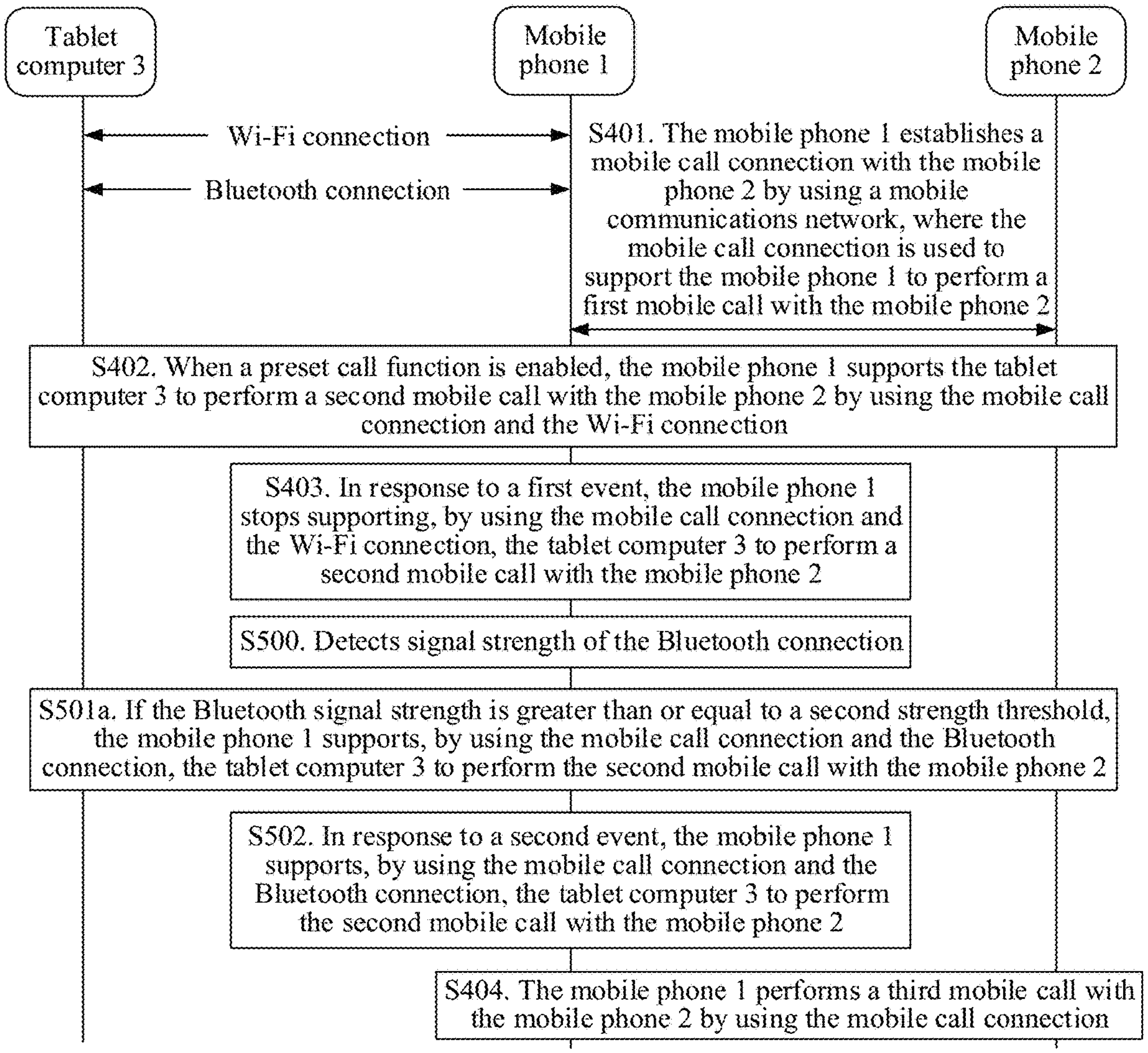
FIG. 5B is a schematic flowchart of a mobile call method according to another embodiment of this application.

Specifically, as shown in FIG. 5B, after S403 and before S501, the method in this embodiment of this application may further include S500. Correspondingly, S501 may be replaced with S501*a*.

S500. The mobile phone 1 detects the signal strength of the Bluetooth connection.

For a specific method in which the mobile phone 1 detects the signal strength of the Bluetooth connection, refer to related descriptions in conventional technologies. Details are not described herein again in this embodiment of this application.

S501*a*. If Bluetooth signal strength is greater than or equal to the second strength threshold, the mobile phone 1 supports, by using the mobile call connection and the Bluetooth connection, the tablet computer 3 to perform the second mobile call with the mobile phone 2.

If the Bluetooth signal strength is greater than or equal to the second strength threshold, it indicates that the mobile phone 1 can implement the mobile call function of the mobile phone 1 on the tablet computer 3 by using the Bluetooth function, and ensure call quality of the user. In this case, the mobile phone supports, by using the mobile call connection and the Bluetooth connection, the tablet computer 3 to perform the second mobile call with the mobile phone 2.

When the mobile phone 1 performs S501*a*, if the mobile phone 1 detects the second event, the mobile phone 1 performs S502 and S404. In this embodiment, the second event may be specifically that: the preset call function of the mobile phone 1 or the tablet computer 3 is disabled, or the Bluetooth function of the mobile phone 1 or the tablet computer 3 is disabled, or the signal strength of the Bluetooth connection between the mobile phone 1 and the tablet computer 3 is less than the second strength threshold.

In some other embodiments, in contrast to S501*a*, if a result obtained by the mobile phone 1 after performing S500 is that the Bluetooth signal does not meet the communication condition (for example, being greater than or equal to the second strength threshold), the mobile phone 1 does not perform S501 and S502, but directly performs S404. In this embodiment, S404 is specifically that if the Bluetooth signal strength is less than the second strength threshold, the mobile phone 1 performs the third mobile call with the mobile phone 2 by using the mobile call connection (not shown in the figure).

In the technical solution provided in this embodiment of this application, in a process in which the mobile phone 1 supports, by using the Wi-Fi connection and the mobile call connection, the tablet computer 3 to perform the second mobile call with the mobile phone 2, if the mobile phone 1 detects the first event, the mobile phone 1 first detects the signal strength of the Bluetooth connection between the mobile phone 1 and the tablet computer 3. If the signal strength of the Bluetooth connection is greater than or equal to the second strength threshold, the mobile phone 1 supports, by using the Bluetooth connection and the mobile call connection, the tablet computer 3 to perform the second mobile call with the mobile phone 2. If the signal strength of the Bluetooth connection is less than the second strength threshold, it indicates that the mobile phone 1 can implement the mobile call function of the mobile phone 1 on the tablet computer 3 by using the Bluetooth connection, but call quality of the user cannot be ensured. In this case, the mobile phone 1 transfers the mobile call from the tablet computer 3 to the mobile phone 1. In this way, a waste of time caused by an invalid handover of the mobile phone 1 from the Wi-Fi connection to the Bluetooth connection can be avoided, and call experience of the user is improved.

In some embodiments, when the foregoing first event is that the signal strength of the Wi-Fi connection is less than the first strength threshold, the mobile phone 1 may perform S500 and S501*a* in response to the first event. However, in a process in which the mobile phone 1 performs S501*a*, the user 10 may be moving at any time. In the moving process, the signal strength of the Bluetooth connection may be reduced while the signal strength of the Wi-Fi connection between the mobile phone 1 and the tablet computer 3 may be enhanced.

Therefore, if the mobile phone 1 detects the second event, the mobile phone 1 may detect the signal strength of the Wi-Fi connection. If the signal strength of the Wi-Fi connection is greater than or equal to the first strength threshold, the mobile phone 1 may again support, by using the mobile call connection and the Wi-Fi connection, the tablet computer 3 to perform the second mobile call with the mobile phone 2. In this embodiment, the second event may be specifically that the signal strength of the Bluetooth connection is less than the second strength threshold.

In the foregoing embodiment, the Wi-Fi connection and the Bluetooth connection are established between the mobile phone 1 and the tablet computer 3. After the mobile phone 1 supports, by using the mobile call connection and the Wi-Fi connection successively, the tablet computer 3 to perform the second mobile call with the mobile phone 2, if the mobile phone 1 detects the second event, the mobile phone 1 does not directly transfer the mobile call from the tablet computer 3 to the mobile phone 1, but detects the signal strength of the Wi-Fi connection again. If the signal strength of the Wi-Fi connection is greater than or equal to the first strength threshold, the mobile phone 1 again supports, by using the Wi-Fi connection, performing the foregoing second mobile call in the tablet computer 3. Only when signal strength of every short-distance wireless communication technology connection cannot meet the corresponding communication condition, the mobile phone 1 transfers the mobile call from the tablet computer 3 to the mobile phone 1. That is, when the mobile phone 1 transfers the mobile call to the tablet computer 3, if none of the preset call function, the Wi-Fi function, and the Bluetooth function is disabled, and signal strength of at least one type of short-range wireless communication technology connection meets the corresponding communication condition, it indicates that the mobile phone 1 can implement the mobile call function of the mobile phone 1 on the tablet computer 3 by using the short-range wireless communication technology that meets the communication condition, and ensure call quality of the user. In this way, frequent transfer of the mobile call between the mobile phone 1 and the tablet computer 3 can be avoided, and call experience of the user can be improved.

In an actual scenario, the foregoing first event is the following two cases: the preset call function in the mobile phone 1 or the tablet computer 3 is disabled, or the Wi-Fi function in the mobile phone 1 or the tablet computer 3 is disabled, which may be actively triggered by the user 10. That is, the user 10 actively disables the preset call function or the Wi-Fi function in the mobile phone 1 or the tablet computer 3. If the user 10 actively triggers disabling of the preset call function or the Wi-Fi function, the user 10 unlikely wishes to end the mobile call between the mobile phone 1 and the mobile phone 2. In this case, if only the Wi-Fi connection is established between the mobile phone 1 and the tablet computer 3, in response to the first event, which is one of the foregoing two cases, the mobile phone 1 may perform the foregoing S403 and S404.

In some other embodiments, if the first event is that the signal strength of the Wi-Fi connection is less than the first strength threshold, the user 10 does not actively trigger the first event. If the Wi-Fi connection is a Wi-Fi direct connection, signal strength of the Wi-Fi direct connection may be generally used to represent a distance between two electronic devices that are directly connected by using Wi-Fi. Stronger signal strength indicates a shorter distance, and weaker signal strength indicates a longer distance. Therefore, it can be learned that when the signal strength of the Wi-Fi direct connection is less than the first strength threshold, it indicates that the distance between the mobile phone 1 and the tablet computer 3 is relatively long.

It can be understood that, in a process of performing S402 by the mobile phone 1, the user 10 is necessarily near a location of the tablet computer 3. If the distance between the mobile phone 1 and the tablet computer 3 is relatively long, generally it is difficult for the user 10 to quickly move near the mobile phone 1. In this case, if the mobile phone 1 detects that the signal strength of the Wi-Fi connection is less than the first strength threshold, even if the mobile phone 1 transfers the mobile call back to the mobile phone 1, the user 10 cannot continue the mobile call with the user 20 by using the mobile phone 1. Therefore, when detecting that the signal strength of the Wi-Fi connection is less than the first strength threshold, the mobile phone 1 may directly end the mobile call between the mobile phone 1 and the mobile phone 2.

Figure 6:
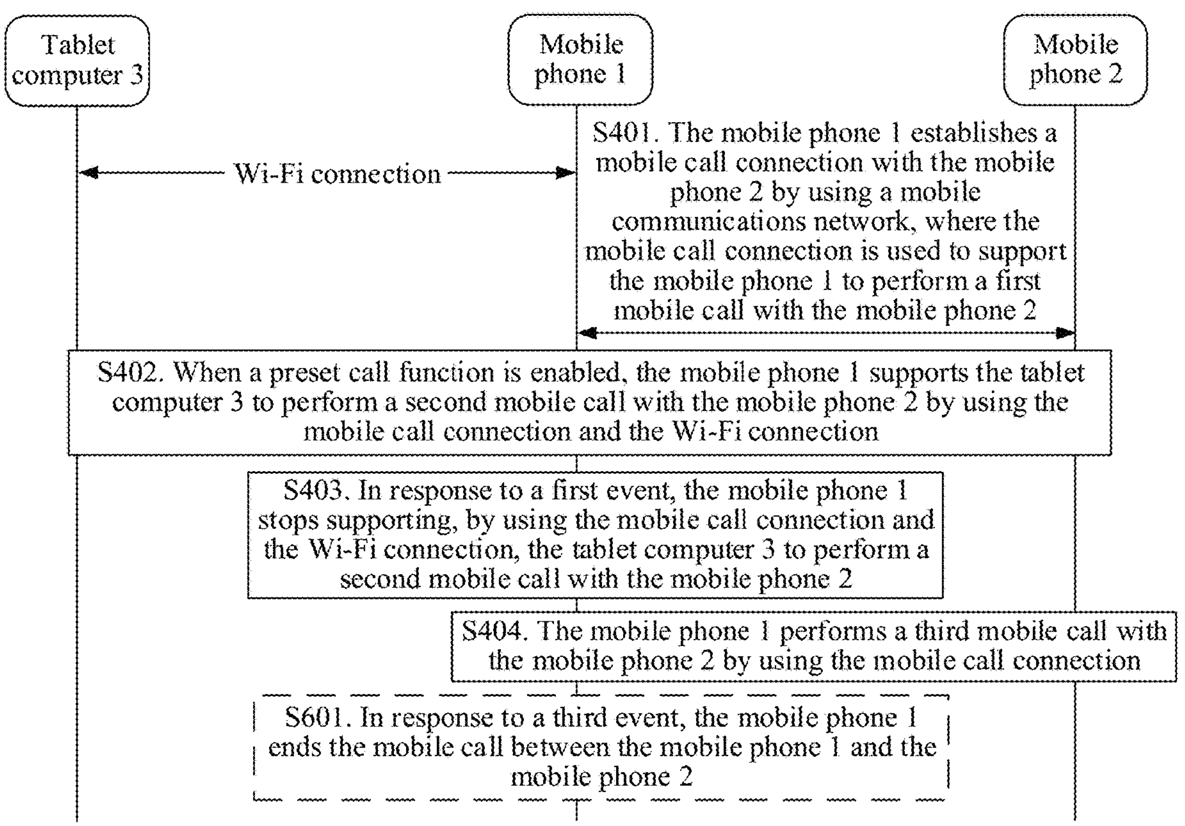
FIG. 6 is a schematic flowchart of a mobile call method according to another embodiment of this application.

Specifically, referring to FIG. 6, FIG. 6 is a flowchart of a mobile call method in this embodiment. In this embodiment, if the first event includes that the preset call function in the first electronic device or the second electronic device is disabled, or the Wi-Fi function corresponding to the first wireless communication connection in the first electronic device or the second electronic device is disabled, after S402, if the mobile phone 1 detects the first event, the mobile phone 1 may perform S403 to S404. If the mobile phone 1 detects a third event, the mobile phone 1 may perform S601.

S601. In response to the third event, the mobile phone 1 ends the mobile call between the mobile phone 1 and the mobile phone 2.

The third event includes that the signal strength of the Wi-Fi connection is less than the first strength threshold.

In the technical solution provided in this embodiment of this application, only the Wi-Fi connection is established between the mobile phone 1 and the tablet computer 3. When the mobile phone 1 transfers the mobile call to the tablet computer 3 by using the Wi-Fi connection, if the mobile phone 1 detects that the signal strength of the Wi-Fi connection is less than the first strength threshold, it indicates that the distance between the mobile phone 1 and the tablet computer 3 is relatively long. In this case, in response to the foregoing third event, the mobile phone 1 controls to end the mobile call between the mobile phone 1 and the mobile phone 2. In this way, the following case can be avoided: after the mobile call is transferred back to the mobile phone 1 from the tablet computer 3, the user 10 cannot use the mobile phone 1 to continue the mobile call with the user 20 in a timely manner. Therefore, call experience of the user is improved.

Similar to the case of the Wi-Fi direct connection, the signal strength of the Bluetooth connection may also be used to represent a distance between two electronic devices that are directly connected by using Bluetooth. Stronger signal strength indicates a shorter distance, and weaker signal strength indicates a longer distance. Therefore, it can be learned that when the signal strength of the Bluetooth connection is less than the second strength threshold, it indicates that the distance between the mobile phone 1 and the tablet computer 3 is relatively long.

If the Wi-Fi connection and the Bluetooth connection are established between the mobile phone 1 and the tablet computer 3, when the mobile phone 1 performs S501, if the mobile phone 1 detects that the signal strength of the Bluetooth connection is less than the second strength threshold, it indicates that the distance between the mobile phone 1 and the tablet computer 3 is relatively long. In this case, even if the mobile call is transferred back to the mobile phone 1, the user 10 cannot move from a location near the tablet computer 3 to a location near the mobile phone 1 in a timely manner and continue the mobile call with the user 20 by using the mobile phone 1. Therefore, the mobile phone 1 may end the mobile call between the mobile phone 1 and the mobile phone 2 in response to that the signal strength of the Bluetooth connection is less than the second strength threshold.

Figure 7:
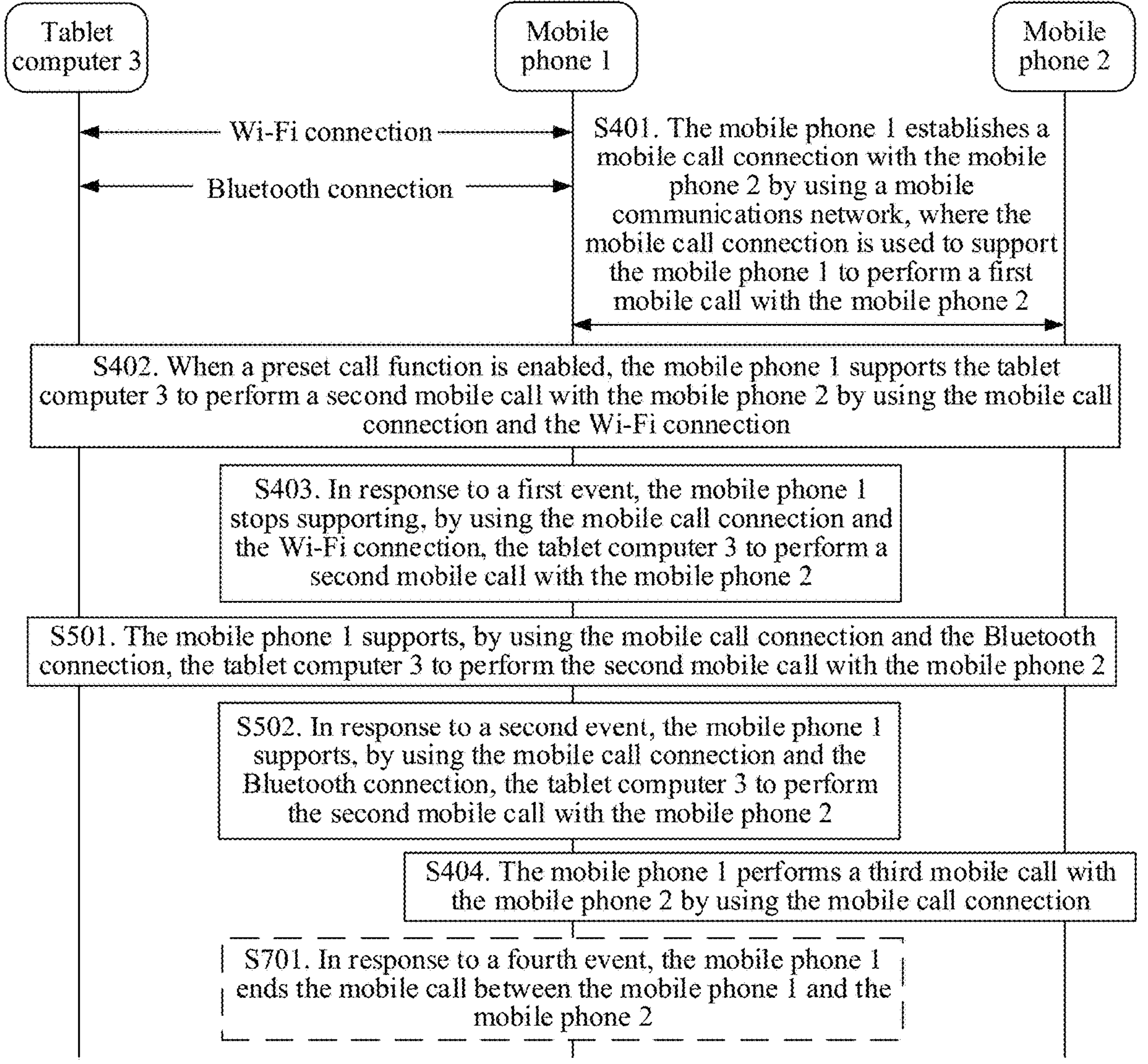
FIG. 7 is a schematic flowchart of a mobile call method according to another embodiment of this application.

Specifically, as shown in FIG. 7, FIG. 7 is a flowchart of a mobile call method according to this embodiment. In this embodiment, when the second event includes that the preset call function in the first electronic device or the second electronic device is disabled, or the Bluetooth function corresponding to the first wireless communication connection in the first electronic device or the second electronic device is disabled, after S501, if the mobile phone 1 detects the second event, the mobile phone 1 may perform S502 and S404. If the mobile phone 1 detects a fourth event, the mobile phone 1 may perform S701.

S701. In response to the fourth event, the mobile phone 1 ends the mobile call between the mobile phone 1 and the mobile phone 2.

The fourth event includes that the signal strength of the Bluetooth connection is less than the second strength threshold.

In the technical solution provided in this embodiment of this application, the Wi-Fi connection and the Bluetooth connection are established between the mobile phone 1 and the tablet computer 3. When the mobile phone 1 transfers the mobile call to the tablet computer 3 by using the Bluetooth connection, if the mobile phone 1 detects that the signal strength of the Bluetooth connection is less than the second strength threshold, it indicates that the distance between the mobile phone 1 and the tablet computer 3 is relatively long. In this case, in response to the foregoing fourth event, the mobile phone 1 controls to end the mobile call between the mobile phone 1 and the mobile phone 2. In this way, the following case can be avoided: after the mobile call is transferred back to the mobile phone 1 from the tablet computer 3, the user 10 cannot use the mobile phone 1 to continue the mobile call with the user 20 in a timely manner. Therefore, call experience of the user is improved.

Some other embodiments of this application provide an electronic device. The electronic device includes: one or more processors, a memory, a wireless communications module, and a mobile communications module. The memory, the wireless communications module, and the mobile communications module are coupled to the one or more processors. The memory stores computer program code. The computer program code includes computer instructions. The computer instructions, when being executed by the processor, causes the electronic device to perform the functions or steps performed by the mobile phone 1 in the method embodiments. For the structure of the electronic device, refer to the structure of the mobile phone 1 shown in FIG. 3.

In some embodiments, the foregoing electronic device is the first electronic device. Specifically, the foregoing first electronic device may be the mobile phone 1.

An embodiment of this application further provides a computer-readable storage medium. The computer-readable storage medium includes computer instructions. When running on the foregoing electronic device (for example, the mobile phone 1), the computer instructions cause the electronic device to perform the functions or steps performed by the mobile phone 1 in the method embodiments.

An embodiment of this application further provides a computer program product. When running on a computer, the computer program product causes the computer to perform the functions or steps performed by the mobile phone 1 in the method embodiments. The computer may be an electronic device, for example, the mobile phone 1.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above.

In the several embodiments provided in this application, it should be understood that the disclosed apparatus and method may be implemented in other manners. For example, the described apparatus embodiment is merely exemplary. For example, the module or the unit division is merely a logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

If the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The storage medium includes: any medium that can store program code, such as a USB flash drive, a removable hard disk, a read only memory (read only memory, ROM), a random access memory (random access memory, RAM), a magnetic disk, or a compact disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A mobile call method, applied to a first electronic device, wherein the first electronic device establishes a first wireless communication connection with a second electronic device, and the first wireless communication connection is a short-range wireless communication technology connection; and the method comprises:

establishing, by the first electronic device, a mobile call connection with a third electronic device by using a mobile communications network, wherein the mobile call connection is used to support the first electronic device to perform a first mobile call with the third electronic device;

displaying, by the first electronic device, third prompt information when a call type of the first mobile call is a video call, wherein the third prompt information is used to request a user to select a call type of a second mobile call;

when a preset call function is enabled, supporting, by the first electronic device by using the mobile call connection and the first wireless communication connection, the second electronic device to perform the second mobile call with the third electronic device; wherein the preset call function is enabled for the second electronic device, and the preset call function is used to support performing a mobile call with another electronic device on the second electronic device by using a mobile call service of the first electronic device; and in response to a first event, stopping supporting, by the first electronic device, by using the mobile call connection and the first wireless communication connection, the second electronic device to perform the second mobile call with the third electronic device, and performing, by the first electronic device, a third mobile call with the third electronic device by using the mobile call connection;

wherein the first event comprises at least one of the following events: a wireless communication function corresponding to the first wireless communication connection in the first electronic device or the second electronic device is disabled, or signal strength of the first wireless communication connection is less than a first strength threshold, or that the preset call function in the first electronic device or the second electronic device is disabled.

2. The method of claim 1, wherein the supporting, by the first electronic device by using the mobile call connection and the first wireless communication connection, the second electronic device to perform a second mobile call with the third electronic device comprises:

receiving, by using the first wireless communication connection, first audio data that is from the second electronic device and collected by the second electronic device, and sending the first audio data to the third electronic device by using the mobile call connection; and receiving second audio data from the third electronic device by using the mobile call connection, and sending the second audio data to the second electronic device by using the first wireless communication connection.

3. The method of claim 1, wherein the first electronic device further establishes a second wireless communication connection with the second electronic device, the second wireless communication connection is a short-range wireless communication technology connection, and the second wireless communication connection is different from the first wireless communication connection; and after the in response to a first event, stopping supporting, by the first electronic device by using the mobile call connection and the first wireless communication connection, the second electronic device to perform the second mobile call with the third electronic device, and before the performing, by the first electronic device, a third mobile call with the third electronic device by using the mobile call connection, the method further comprises:

supporting, by the first electronic device by using the mobile call connection and the second wireless communication connection, the second electronic device to perform the second mobile call with the third electronic device; and in response to a second event, stopping supporting, by the first electronic device by using the mobile call connection and the second wireless communication connection, the second electronic device to perform the second mobile call with the third electronic device, wherein the second event comprises at least one of the following events: the preset call function in the first electronic device or the second electronic device is disabled; signal strength of the second wireless communication connection is less than a second strength threshold; or a wireless communication function corresponding to the second wireless communication connection in the first electronic device or the second electronic device is disabled.

4. The method of claim 1, wherein after the when a preset call function is enabled, supporting, by the first electronic device by using the mobile call connection and the first wireless communication connection, the second electronic device to perform a second mobile call with the third electronic device, the method further comprises:

ending, by the first electronic device in response to a third event, the mobile call between the first electronic device and the third electronic device; wherein the third event comprises that: signal strength of the first wireless communication connection is less than a second strength threshold.

5. The method of claim 1, wherein the method further comprises:

sending, by the first electronic device in response to the first event, first prompt information; wherein the first prompt information is used to prompt a user that the mobile call between the first electronic device and the third electronic device is to be transferred from the second electronic device to the first electronic device.

6. The method of claim 1, wherein a call type of the first mobile call is a video call or a voice call, and a call type of the second mobile call is a voice call; and a call type of the third mobile call is the same as the call type of the first mobile call, or the call type of the third mobile call is the same as the call type of the second mobile call.

7. The method of claim 1, wherein a call type of the first mobile call is a video call, and a call type of the second mobile call is a voice call; and after the stopping supporting, by using the mobile call connection and the first wireless communication connection, the second electronic device to perform the second mobile call with the third electronic device, and before the performing, by the first electronic device, a third mobile call with the third electronic device by using the mobile call connection, the method further comprises:

displaying, by the first electronic device, second prompt information, wherein the second prompt information is used to request the user to select the call type of the third mobile call;

determining, by the first electronic device in response to a first selection operation performed by the user on the second prompt information, that the call type of the third mobile call is a video call; and determining, by the first electronic device in response to a second selection operation performed by the user on the second prompt information, that the call type of the third mobile call is a voice call.

8. The method according to claim 5, wherein the first prompt information is further used to prompt the user of a reason why the mobile call is to be transferred from the second electronic device to the first electronic device.

9. The method according to claim 8, wherein the first prompt information is simultaneously displayed on the first electronic device and the second electronic device.

10. An electronic device, configured to act as a first electronic device, the electronic device comprising:

one or more processors, a memory, a wireless communications module, and a mobile communications module, wherein:

the memory, the wireless communications module, and the mobile communications module are coupled to the one or more processors, the memory stores computer program code, the computer program code comprises computer instructions, and when the one or more processors execute the computer instructions, the electronic device performs the following steps:

establishing a mobile call connection with a third electronic device by using a mobile communications network, wherein the mobile call connection is used to support the first electronic device to perform a first mobile call with the third electronic device;

establishing a first wireless communication connection with a second electronic device, wherein the first wireless communication connection is a short-range wireless communication technology connection;

displaying third prompt information when a call type of the first mobile call is a video call, wherein the third prompt information is used to request a user to select a call type of a second mobile call;

when a preset call function is enabled, supporting, by using the mobile call connection and the first wireless communication connection, the second electronic device to perform the second mobile call with the third electronic device; wherein the preset call function is enabled for the second electronic device, and the preset call function is used to support performing a mobile call with another electronic device on the second electronic device by using a mobile call service of the first electronic device; and in response to a first event, stopping supporting by using the mobile call connection and the first wireless communication connection, the second electronic device to perform the second mobile call with the third electronic device, and performing, by the first electronic device, a third mobile call with the third electronic device by using the mobile call connection;

wherein the first event comprises at least one of the following events: a wireless communication function corresponding to the first wireless communication connection in the first electronic device or the second electronic device is disabled, signal strength of the first wireless communication connection is less than a first strength threshold, or that the preset call function in the first electronic device or the second electronic device is disabled.

11. The electronic device of claim 10, wherein when the one or more processors execute the computer instructions, the electronic device further performs:

determining, by the first electronic device in response to a first selection operation performed by the user on the third prompt information, that the call type of the second mobile call is a video call; and determining, by the first electronic device in response to a second selection operation performed by the user on the third prompt information, that the call type of the second mobile call is a voice call.

12. The electronic device of claim 10, wherein a call type of the second mobile call is a voice call, and wherein when the one or more processors execute the computer instructions, the electronic device further performs:

downgrading the first mobile call to a voice call automatically when the call type of the first mobile call is a video call.

13. The electronic device of claim 10, wherein the first electronic device further establishes a second wireless communication connection with the second electronic device, the second wireless communication connection is a short-range wireless communication technology connection, and the second wireless communication connection is different from the first wireless communication connection; and after the in response to a first event, stopping supporting, by the first electronic device by using the mobile call connection and the first wireless communication connection, the second electronic device to perform the second mobile call with the third electronic device, and before the performing, by the first electronic device, a third mobile call with the third electronic device by using the mobile call connection, when the one or more processors execute the computer instructions, the electronic device further performs:

supporting, by the first electronic device by using the mobile call connection and the second wireless communication connection, the second electronic device to perform the second mobile call with the third electronic device; and in response to a second event, stopping supporting, by the first electronic device by using the mobile call connection and the second wireless communication connection, the second electronic device to perform the second mobile call with the third electronic device.

14. The electronic device of claim 13, wherein the second event comprises at least one of the following events: the preset call function in the first electronic device or the second electronic device is disabled; signal strength of the second wireless communication connection is less than a second strength threshold; or a wireless communication function corresponding to the second wireless communication connection in the first electronic device or the second electronic device is disabled.

15. The electronic device of claim 10, wherein a call type of the first mobile call is a video call or a voice call, and a call type of the second mobile call is a voice call; and a call type of the third mobile call is the same as the call type of the first mobile call, or the call type of the third mobile call is the same as the call type of the second mobile call.

16. The electronic device of claim 10, wherein a call type of the first mobile call is a video call, and a call type of the second mobile call is a voice call; and after the stopping supporting, by using the mobile call connection and the first wireless communication connection, the second electronic device to perform the second mobile call with the third electronic device, and before the performing, by the first electronic device, a third mobile call with the third electronic device by using the mobile call connection, when the one or more processors execute the computer instructions, the electronic device further performs:

displaying, by the first electronic device, second prompt information, wherein the second prompt information is used to request the user to select the call type of the third mobile call.

17. The electronic device of claim 16, wherein when the one or more processors execute the computer instructions, the electronic device further performs:

determining, by the first electronic device in response to a first selection operation performed by the user on the second prompt information, that the call type of the third mobile call is a video call; and determining, by the first electronic device in response to a second selection operation performed by the user on the second prompt information, that the call type of the third mobile call is a voice call.

18. A non-transitory computer readable storage medium, wherein the computer-readable storage medium stores instructions, and when running on a computer, the instructions cause the computer to perform the following steps:

establishing, by a first electronic device, a mobile call connection with a third electronic device by using a mobile communications network, wherein the mobile call connection is used to support the first electronic device to perform a first mobile call with the third electronic device;

establishing, by the first electronic device, a first wireless communication connection with a second electronic device, wherein the first wireless communication connection is a short-range wireless communication technology connection;

displaying, by the first electronic device, third prompt information when a call type of the first mobile call is a video call, wherein the third prompt information is used to request a user to select a call type of a second mobile call;

when a preset call function is enabled, supporting, by the first electronic device by using the mobile call connection and the first wireless communication connection, the second electronic device to perform the second mobile call with the third electronic device; wherein the preset call function is enabled for the second electronic device, and the preset call function is used to support performing a mobile call with another electronic device on the second electronic device by using a mobile call service of the first electronic device; and in response to a first event, stopping supporting, by the first electronic device, by using the mobile call connection and the first wireless communication connection, the second electronic device to perform the second mobile call with the third electronic device, and performing, by the first electronic device, a third mobile call with the third electronic device by using the mobile call connection;

wherein the first event comprises at least one of the following events: a wireless communication function corresponding to the first wireless communication connection in the first electronic device or the second electronic device is disabled, signal strength of the first wireless communication connection is less than a first strength threshold, or that the preset call function in the first electronic device or the second electronic device is disabled.

19. The non-transitory computer readable storage medium according to claim 18, wherein the first electronic device further establishes a second wireless communication connection with the second electronic device, the second wireless communication connection is a short-range wireless communication technology connection, and the second wireless communication connection uses a different communication protocol than the first wireless communication connection; and after stopping supporting, by the first electronic device by using the mobile call connection and the first wireless communication connection, the second electronic device to perform the second mobile call with the third electronic device, and before performing, by the first electronic device, the third mobile call with the third electronic device by using the mobile call connection, when running on the computer, the instructions cause the computer to perform the following further steps:

supporting, by the first electronic device by using the mobile call connection and the second wireless communication connection, the second electronic device to perform the second mobile call with the third electronic device; and in response to a second event, stopping supporting, by the first electronic device by using the mobile call connection and the second wireless communication connection, the second electronic device to perform the second mobile call with the third electronic device.

20. The non-transitory computer readable storage medium according to claim 19, wherein the first wireless communication connection is a wireless fidelity (Wi-Fi) communication connection, and the second wireless communication connection is a Bluetooth communication connection.

* * * * *